(12) United States Patent
Lee et al.

(10) Patent No.: US 7,209,178 B1
(45) Date of Patent: Apr. 24, 2007

(54) OPTICAL TRANSFER SYSTEM HAVING A TRANSMITTER AND A RECEIVER

(75) Inventors: Jae-hun Lee, Incheon (KR);
Byung-joon Moon, Yongin (KR)

(73) Assignee: Samsung Electronics, Co., Ltd. (KR)

( * ) Notice: Subject to any disclaimer, the term of this patent is extended or adjusted under 35 U.S.C. 154(b) by 586 days.

(21) Appl. No.: 09/666,218

(22) Filed: Sep. 21, 2000

(30) Foreign Application Priority Data

Sep. 21, 1999 (KR) .................................. 99-40649
Nov. 11, 1999 (KR) .................................. 99-49951

(51) Int. Cl.
*H04N 9/475* (2006.01)

(52) U.S. Cl. ..................... 348/513; 348/518; 348/804; 348/536

(58) Field of Classification Search ................ 348/513, 348/518, 528, 536, 537, 804; 398/192, 183, 398/208; 375/354, 376; 714/700
See application file for complete search history.

(56) References Cited

U.S. PATENT DOCUMENTS

| | | | | | |
|---|---|---|---|---|---|
| 5,206,889 | A | * | 4/1993 | Unkrich | 377/20 |
| 5,388,103 | A | * | 2/1995 | Ishii | 370/503 |
| 5,579,352 | A | * | 11/1996 | Llewellyn | 375/376 |
| 5,592,508 | A | * | 1/1997 | Cooper | 375/216 |
| 5,602,882 | A | * | 2/1997 | Co et al. | 375/372 |
| 5,633,608 | A | * | 5/1997 | Danger | 327/270 |
| 5,761,348 | A | * | 6/1998 | Honma | 382/305 |
| 5,887,039 | A | * | 3/1999 | Suemura et al. | 375/365 |
| 6,239,627 | B1 | * | 5/2001 | Brown et al. | 327/116 |
| 6,477,184 | B1 | * | 11/2002 | Ishikawa | 370/509 |
| 6,557,110 | B2 | * | 4/2003 | Sakamoto et al. | 713/503 |

* cited by examiner

*Primary Examiner*—Trang U. Tran
(74) *Attorney, Agent, or Firm*—Mills & Onello LLP

(57) ABSTRACT

An optical transfer system having a transmitter and a receiver converts an externally-applied video signal into an optical signal and restores the optical signal to the original video signal The system includes a video controller, a transmitter, a transmission photo diode, an optical transmission line, a reception photo diode, and a receiver. The video controller separates color signals and a horizontal/vertical synchronous signal from the video signal, and transmits the color signals and the horizontal/vertical synchronous signal in response to externally-applied predetermined data enable and clock signals. The transmitter skew-compensates and compresses signals received from the video controller and converts the compressed signals into a driving current. The transmission photo diode converts the driving current into an optical signal and outputs the optical signal. The optical transmission line is comprised of a predetermined number of channels, and transmits the optical signal. The reception photo diode converts the optical signal received from the optical transmission line into a current signal and outputs the current signal. The receiver converts the current signal into a voltage signal, decompresses the voltage signal, compensates for the skew of the voltage signal, and restores the original signal. Accordingly, data for an LCD monitor is optically transmitted, so that rapid data transmission can be achieved and so that electromagnetic interference (EMI) noise can be removed.

11 Claims, 24 Drawing Sheets

OPTICAL TRANSFER SYSTEM HAVING A TRANSMITTER AND A RECEIVER

BACKGROUND OF THE INVENTION

1. Field of the Invention

The present invention relates to data transfer systems, and more particularly, to an optical transfer system having a transmitter and a receiver.

2. Description of the Related Art

In general, conventional cathode ray tube (CRT) monitors are controlled using analog control systems. Contemporary liquid crystal display (LCD) monitors, however, use digital signals as driving signals. For example, an LCD monitor that is installed exterior to a computer processor, converts analog video signals into digital signals using an analog-to-digital converter within the monitor, and displays data on its screen in response to the digital signals. Also, LCD monitors for notebook computers receive digital signals from the main processor and display data corresponding to the received digital signals on their screens. However, this transmission and display of digital signals may be affected by signal interference or noise. To mitigate this problem, a method of transforming digital signals using a panel link chip, which uses a low voltage differential signaling (LVDS) technique, or the like, to transmit the digital signals to an LCD panel and display the same on a screen, have become widely used.

However, conventional digital-based LCD monitors use a coaxial cable to transmit data. In this case, the cost may rise with the use of an analog-to-digital converter. Also, as the display resolution gradually increases, special measures such as an increase in transmission rate are required. Furthermore, when data is transferred via a coaxial cable, restrictions in the signal transfer distance are evident. That is, when the length of a cable increases, long-distance transmission can be difficult due to generation of noise due to the cable length. Also, electromagnetic interference (EMI) can occur between cables, having an adverse effect on transmission quality.

SUMMARY OF THE INVENTION

An object of the present invention is to provide an optical transfer system having a transmitter and a receiver, by which rapid transmission can be achieved, and by which electromagnetic interference between cables can be eliminated.

Another object of the present invention is to provide an optical driver included in the transmitter of the optical transfer system.

Still another object of the present invention is to provide an optical receiver included in the receiver of the optical transfer system.

Yet another object of the present invention is to provide a data restoration and skew compensation circuit capable of stably restoring original information data by compensating for skew between data and a word clock signal which are received via a transmission channel from the receiver.

Still yet another object of the present invention is to provide a data restoration method performed in the data restoration and skew compensation circuit.

To achieve the first object, the present invention provides an optical transfer system including a transmitter and a receiver, for converting an externally-applied video signal into an optical signal and restoring the optical signal to the original video signal. The optical transfer system includes a video controller, a transmitter, a transmission photo diode, an optical transmission line, a reception photo diode, and a receiver. The video controller separates color signals and a horizontal/vertical synchronous signal from the video signal, and transmits the color signals and the horizontal/vertical synchronous signal in response to a predetermined data enable signal and a clock signal which are externally applied. The transmitter skew-compensates and compresses signals received from the video controller and converts the compressed signals into a driving current. The transmission photo diode converts the driving current into an optical signal and outputs the optical signal. The optical transmission line is comprised of a predetermined number of channels, and transmits the optical signal. The reception photo diode converts the optical signal received from the optical transmission line into a current signal and outputs the current signal. The receiver converts the current signal into a voltage signal, decompresses the voltage signal, compensates for the skew of the voltage signal, and restores the original signal.

To achieve the second object, the present invention provides an optical driver in a transmitter for transmitting predetermined channel data via an optical transmission line, as an optical signal, the optical driver including a bias and modulation resistance variation unit, a bandgap circuit, and a laser driver. The bias and modulation resistance variation unit includes a bias resistor and a modulation resistor, the resistance value of each of which is variable, and varies a current amount which is output due to variations in the resistance values of the bias resistor and the modulation resistor. The bandgap circuit determines a bandgap reference voltage, which is maintained to a constant value independently of external changes, and varies a bias current or a modulation current according to the determined reference voltage and current variations due to variations in the resistance of the bias resistor and the modulation resistor. The laser driver converts received channel data into current signals and adds the modulation current and bias current of the current signals to obtain a driving current for driving external optical devices.

To achieve the third object, the present invention provides an optical receiver in a receiver for receiving channel data which is converted into a current signal by an external photo diode for reception, the optical receiver including a bias circuit, a current-to-voltage converter, an amplifier, a duty compensator and a level converter. The bias circuit receives a predetermined amount of current from a power supply voltage and generates first and second bias currents. The current-to-voltage converter sources a current in response to the first bias current and converts a current signal received from the reception photo diode into a differential voltage signal. The amplifier sources a current in response to the first bias current and amplifies the differential voltage signal to obtain first and second differential output signals. The duty compensator is realized with different comparators having a current summing structure in which output currents are summed, and sources a current in response to the first bias current and compares the first differential output signal with a first reference voltage and the second differential output signal with a second reference voltage to obtain first and second output signals which correspond to the compared results. The level converter sources a current in response to the second bias current and digitalizes the first and second output signals by converting the voltage levels of the first and second output signals.

To achieve the fourth object, the present invention provides a data restoration and skew compensation unit in a receiver having a phase locked loop for generating first through n-th non-overlapped clock signals, each having a predetermined offset to prevent mutual overlapping, the receiver for restoring data in which n-bit synchronous signals (where n is a positive integer greater than or equal to 1) and n-bit information data are multiplexed and transmitted in series via a transmission channel, in response to the first through n-th non-overlapped clock signals, the data restoration and skew compensation unit including a first latch unit, a second latch unit and a synchronizer. The first latch unit latches received serial data in units of n+N−1 (where N is a positive integer greater than or equal to 3) bits in parallel in response to the first through n-th non-overlapped clock signals, and outputs N n-bit latched state data having the time difference of a predetermined offset therebetween. The second latch unit latches in parallel the N state data in response to an X-th ($1 \leq X \leq n$) non-overlapped clock signal having the greatest timing margin among the first through n-th non-overlapped clock signals. The synchronizer outputs state data from which the synchronous signal is detected, among data latched by the second latch unit, as restored information data, in response to a predetermined synchronous existence signal and the X-th non-overlapped clock signal.

To achieve the fifth object, the present invention provides a method of restoring information data from data in which n-bit synchronous signals (where n is a positive integer greater than or equal to 1) and the n-bit information data are multiplexed and transmitted together with a clock signal in series via a transmission channel. In this method, first through n-th non-overlapped clock signals, each having a predetermined offset to prevent mutual overlapping, are generated on the basis of the clock signal. Received serial data is latched in units of n+N−1 (where N is a positive integer greater than or equal to 3) bits in parallel in response to the first through n-th non-overlapped clock signals. N n-bit latched state data having the time difference of a predetermined offset therebetween are generated. The N state data is latched in parallel in synchronization with a X-th ($1 \leq X \leq n$) non-overlapped clock signal having the greatest timing margin among the first through n-th non-overlapped clock signals. When the serial data is the synchronous signal, state data from which the synchronous signal is detected, among the latched state data, is determined to be the restored information data.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
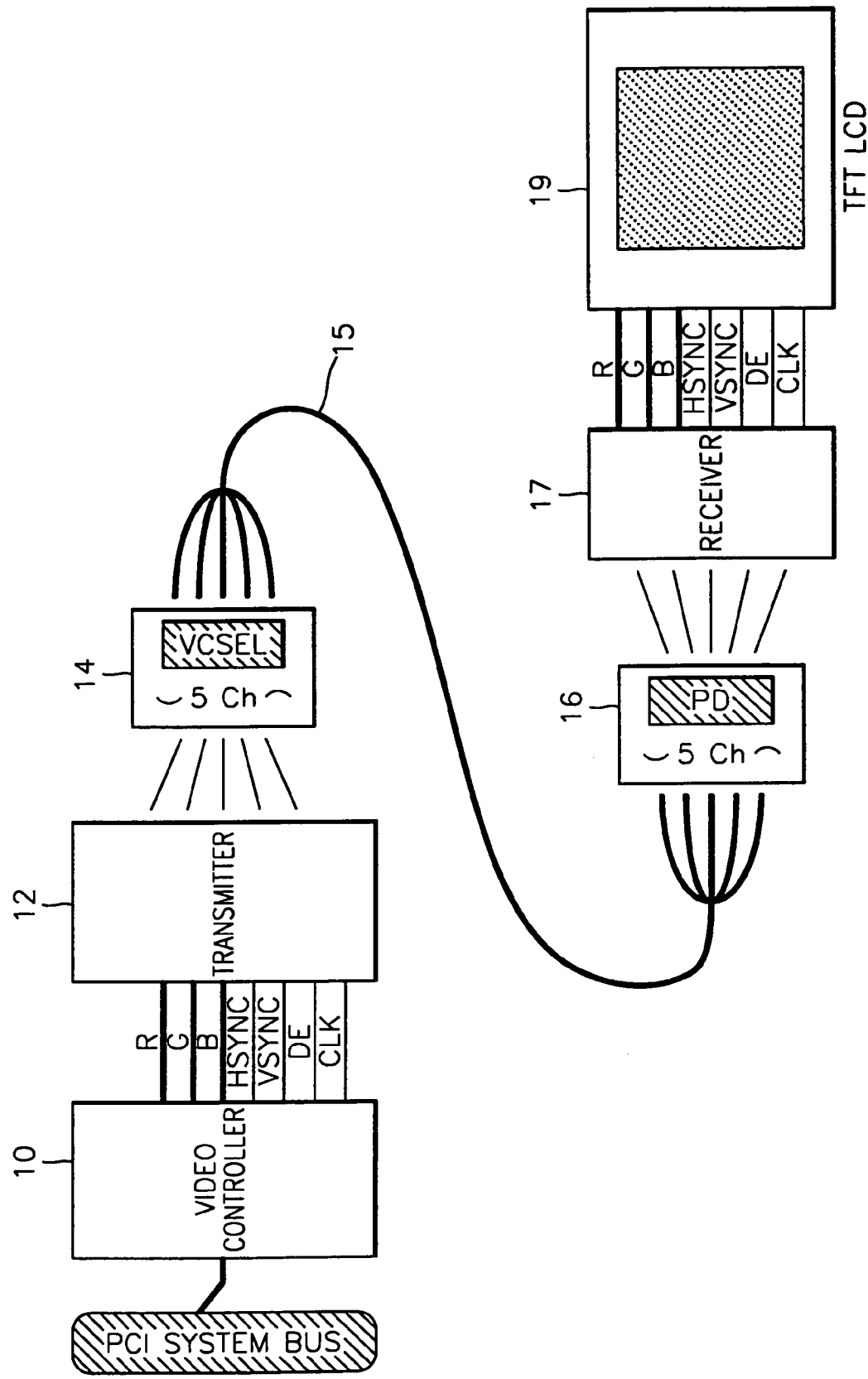
FIG. 1 is a block diagram schematically illustrating an optical transfer system according to an embodiment of the present invention.

Referring to FIG. 1, an optical transfer system according to an embodiment of the present invention includes a video controller 10, a transmitter 12, an optical transmission diode 14, an optical fiber 15 (for example comprising plastic), an optical reception diode 16 and a receiver 17. For convenience of explanation, a thin film transistor (TFT) LCD panel 19 is shown in FIG. 1. The optical transfer system according to the present invention can be used between an LCD monitor and a personal computer (PC) or between other display devices and external apparatuses.

The video controller 10 separates a video signal received from a PC central processing unit main body, or from another external source, via a programmable communication system bus (for example, peripheral component interconnect (PCI) bus), into an R/G/B color signal and a horizontal/vertical synchronous signal HSYNC/VSYNC. Additionally, the video controller 10 transfers the R/G/B color signal or the horizontal/vertical synchronous signal HSYNC/VSYNC in response to a data enable signal DE and a clock signal CLK which are externally applied. For example, the R/G/B color signal can be realized as an 8-bit digital signal.

The transmitter 12 compensates for skew and compresses a digital signal received from the video controller 10, and generates a driving current for driving the optical transmission diode 14 using the compressed signal.

The optical transmission diode 14 is generally realized with a laser diode such as a vertical cavity surface emitting laser (VCSEL), and converts a driving current received from the transmitter 12 into an optical signal and transmits the optical signal.

The plastic optical fiber (POF) 15 transfers the optical signal from the optical transmission diode 14 to the optical reception diode 16 on the receiving side. The optical reception diode 16 is generally realized with a photo diode, and converts the received optical signal into a current signal and outputs the current signal.

The receiver 17 converts the current signal received from the optical reception diode 16 into a voltage signal, and restores the original digital signal by decompressing and skew-compensating for the voltage signal. Then, the restored signal is displayed on the TFT LCD panel 19 in response to the clock signal CLK and the data enable signal DE.

Figure 2:
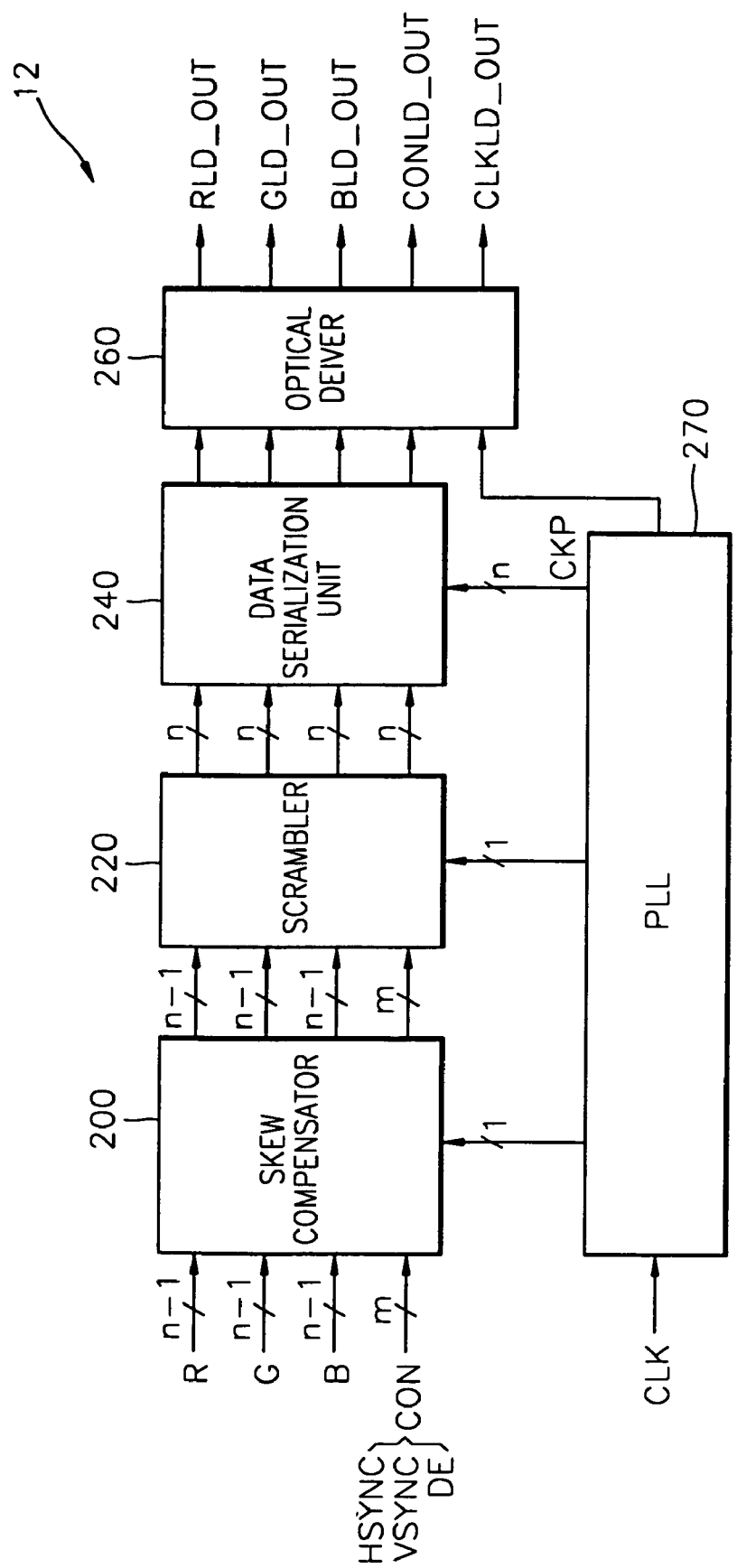
FIG. 2 is a block diagram of the transmitter of the optical transfer system shown in FIG. 1.

The transmitter of the optical transfer system shown in FIG. 1 will now be described in detail. Referring to FIG. 2, the transmitter 12 includes a skew compensator 200, a scrambler 220, a data serialization unit 240, a phase locked loop (PLL) 270 and an optical driver 260.

The PLL 270 generates clock signals which synchronize with a clock signal CLK received from the video controller 10 of FIG. 1, and provides the generated clock signals to each block of the transmitter 12. That is, the PLL 270 receives a clock signal CLK having a frequency of 25 MHz to 112 MHz in the case of rapid transmission with a transmission rate on the order of gigahertz (GHz) level, and generates non-overlapped clock signals CKP for data compression which is performed in the data serialization unit 240 using a synchronized clock signal.

The skew compensator 200 receives a predetermined number of bits of channel data from the video controller 10 in response to the synchronized clock signal, and compensates for skew generated between channel data with respect to the synchronized clock signal. Here, the skew denotes the difference between data transmission times with respect to a reference clock signal. That is, the skew compensator 200 compensates for the skew generated among a plurality of data lines with respect to a clock signal which is a basis for data transmission. If the skew between data channels exceeds an allowable value, video data is skewed or a synchronous signal is not detected, resulting in abnormal screen display. To prevent this problem, the skew compensator 200 generates a particular bit stream to specify the start and end of a data bitstream. The start portion of the data bit streams are preferably arranged on the basis of an arbitrary point in time. In FIG. 2, each R/G/B signal is realized with 8 bits (n−1), and a control signal CON can be realized with four bits (m). Also, it is assumed that the horizontal/vertical synchronous signal HSYNC/VSYNC and the data enable signal DE are applied via a control signal CON input port.

The scrambler 220 of FIG. 2 counts the number of high levels and low levels of skew-compensated channel data in response to the synchronized clock signal, and adds counted information to each channel data as direct current balance information. That is, the direct current balance information added in the scrambler 220 represents whether the high level and the low level of each data are balanced upon digital transmission. Thus, the direct current balance information provides a basis of differentiating the level of data when data is restored on the receiving end. If overload is applied to a power supply voltage, an error may be generated in the received data upon differentiation between the high level and the low level due to a variance in power supply and/or ground. Also, if a high level period and a low level period are not balanced upon data transmission, a reference potential is proportionally changed. Thus, an error may be generated when the receiving side differentiates the low level and the high level of data. To prevent this problem, the scrambler 220 counts the number of high level periods and low level periods within a data character. The results of the count are attached to the data, for example at the data head, to be transmitted to the receiving side. If a character received by the scrambler 220 is composed of 8 data bits (n−1) then 9 bits (n) are output from the scrambler 220, to which direct current balance information has been added.

The data serialization unit 240 of FIG. 2 compresses parallel data for each channel output from the scrambler 220 in response to the non-overlapped clock signals CKP generated by the PLL 270, resulting in bit channel data. Here, the channel data may comprise an R/G/B color signal and a control signal CON. If data is transferred without being compressed, as many channels as the number of bits constituting each R/G/B color signal and as many channels as the number of bits constituting the control signal CON are required. However, if data is compressed and then transferred as in the present invention, the number of channels can be reduced. Also, a data transmission rate increases in proportion to a data compression ratio. If 9-bit parallel data is compressed into a 1-bit signal, the transmission rate must be nine times as fast as the transmission rate for the 9-bit parallel data. As described above, it is possible to realize a 1.008 Gbps transmission rate and a 1.458 Gbps transmission rate according to a suitable data compression ratio. The data serialization unit 240 is realized with units capable of rapid gating, in order to achieve rapid transmission rates.

The optical driver 260 receives compressed channel data and the clock signal via different channels, and converts the received data into current signals, in order to drive external optical devices. The optical driver 260 also changes a modulation current and a bias current using a band gap reference voltage, an external modulation resistance, and a bias resistance. To be more specific, the optical driver 260 converts channel data into currents and produces driving currents by reflecting the modulation current and the bias current in the channel data. In FIG. 2, RLD_OUT, GLD_OUT and BLD_OUT are R, G and B signals which have been converted into optical signals, respectively, and CONLD_OUT and CLKLD_OUT denote a control signal CON and a clock signal CLK which have been converted into optical signals, respectively. Here, the output intensity of a current for driving optical devices can be controlled externally. The optical driver 260 will now be described in more detail with reference to FIG. 3.

Figure 3:
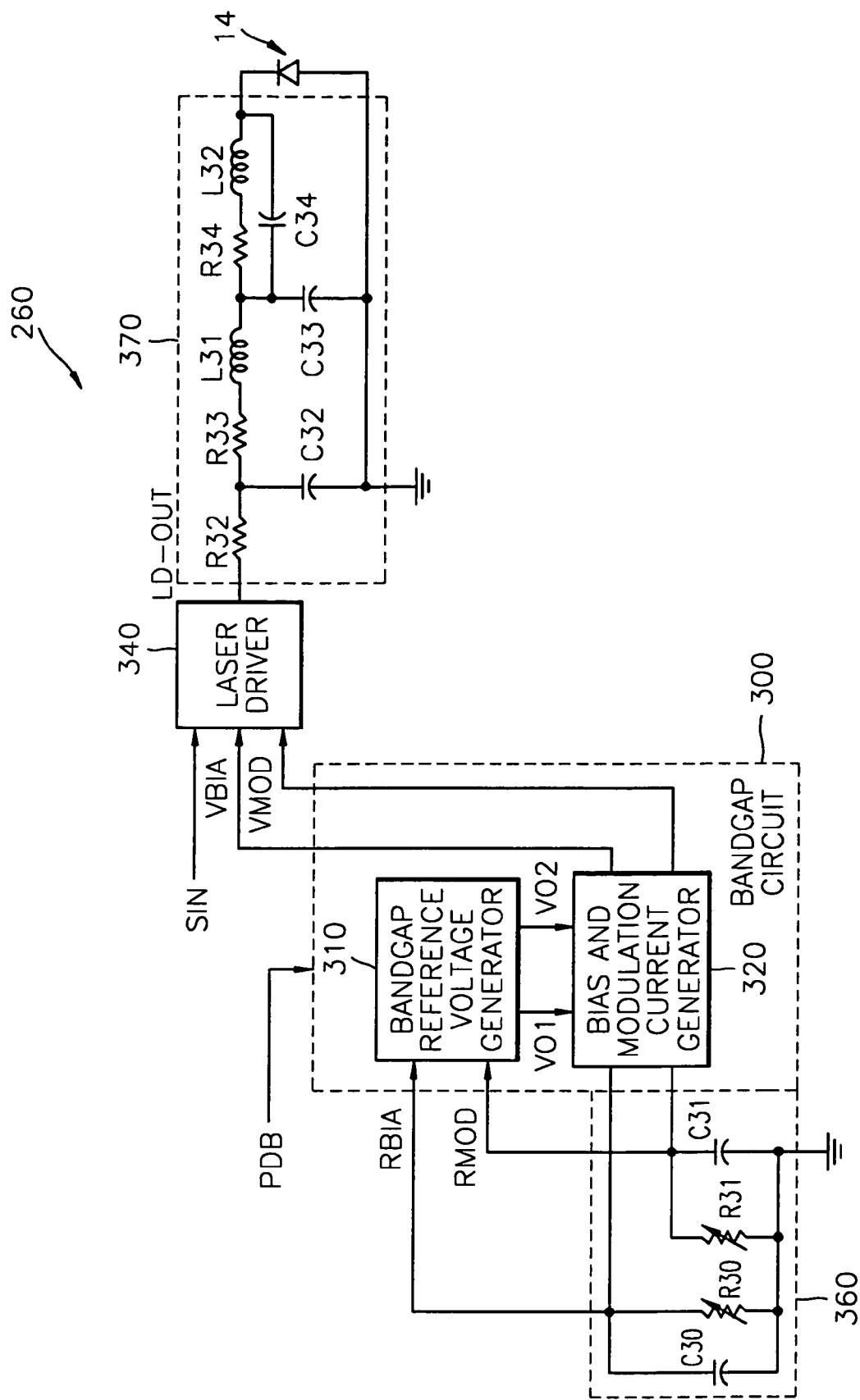
FIG. 3 is a block diagram of the optical driver of the transmitter device shown in FIG. 2.

Referring to FIG. 3, which is a block diagram of the optical driver 260 shown in FIG. 2, the optical driver 260 includes a bandgap circuit 300, a bias and modulation resistance variation unit 360 and a laser driver 340. For convenience of explanation, an external parasitic device unit 370, and the laser diode 14 of FIG. 1 are also shown in FIG. 3.

The bandgap circuit 300 of FIG. 3 includes a bandgap reference voltage generator 310 and a bias and modulation current generator 320. The bandgap circuit 300 generates an external photo diode driving current on the basis of an internal bandgap reference voltage. The bias and modulation resistance variation unit 360 is installed on the exterior of the bandgap circuit 300 to vary a bias current VBIA and a modulation current VMOD by changing a bias resistance value and a modulation resistance value. Here, the modulation current VMOD is defined as a current for varying the swing scope of an optical signal which is actually transmitted. The bias current VBIA is defined as a current for controlling the direct current level of an optical signal which is output, and is biased to the on/off voltage boundary of a laser diode to prevent a degradation in the transmission rate of data due to the on/off voltage of the laser diode.

As described above, the bandgap reference voltage generator 310 internally generates a bandgap reference voltage for determining a driving current for driving a laser diode. The bandgap reference voltage is maintained at a constant value, regardless of factors such as process conditions, external temperature, power or noise. The bandgap reference voltage generator 310 also operates and amplifies a modulation voltage which is generated by external modulation resistance, and a bias voltage which is generated by bias resistance. Here, each operationally-amplified output is maintained to be constant.

The bias and modulation current generator 320 maintains its output voltage at a constant value by feeding operationally-amplified outputs VO1 and VO2, output from the bandgap reference voltage generator 310, back to the bandgap reference voltage generator 310. The bias and modulation current generator 320 also varies a laser diode driving current in response to a bias current and a modulation current, which are, for example, controlled externally.

The bias and modulation resistance variation unit 360 of FIG. 3 includes a resistor R30 and a capacitor C30, which are connected in parallel between the bias voltage RBIA and ground GND, and a resistor R31 and a capacitor C31, which are connected between the modulation voltage RMOD and ground GND. The bias resistance value of the resistor R30 can be externally varied. Thus, a bias current for driving a laser diode is determined by the value of the resistor R30. The modulation resistance value of the resistor R31 can also be externally controlled. Thus, the swing width of a current for driving a laser diode is determined according to the variation in the value of the resistor R31. The capacitors C30 and C31 are added to reduce the influence of external noise.

The laser driver 340 receives each channel data SIN and converts the channel data into a current signal, and generates a driving current LD_OUT by summing the modulation current VMOD and the bias current VBIAS, which are generated by the bandgap circuit 300. The laser driver 340 will be described in more detail below with reference to FIG. 5.

The external parasitic device unit 370 of FIG. 3 includes resistors R32 and R33, capacitors C32 and C33, coils L31 and L32, a resistor R34 and a capacitor C34. That is, the external parasitic device unit 370 has a structure in which parasitic elements that can be generated between the output of the laser driver 340 and the laser diode 14 are modeled. For example, parasitic capacitor elements generated by an integrated circuit pad, and parasitic elements generated by the thickness or area of a chip bonding wire, can be modeled. When compressed data is transferred at a high-speed frequency of 1.5 Gbps, as in the present invention, the influence of parasitic elements cannot be disregarded. Thus, these parasitic elements are preferably considered in the system design.

The optical driver 260 shown in FIG. 3 is provided for each channel. That is, five driver circuits are provided for three channels for R, G and B color signals and two channels for the control signal CON and the clock signal CLK. Here, the number of channels can be varied, depending on the application.

Figure 4:
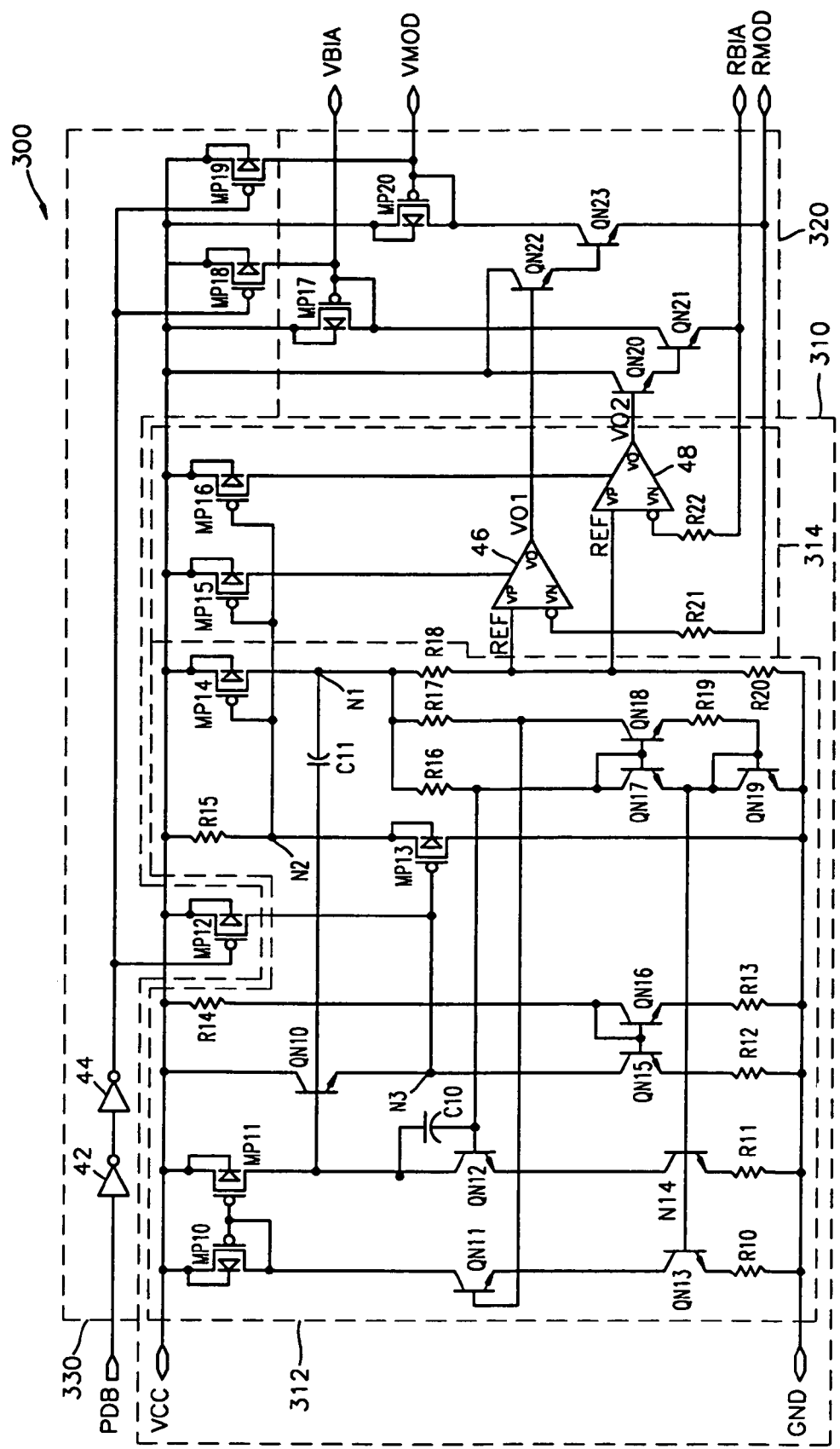
FIG. 4 is a circuit diagram illustrating the band gap circuit in the optical driver shown in FIG. 3 in detail.

FIG. 4 is a circuit diagram illustrating in detail the bandgap circuit 300 in the optical driver 260 shown in FIG. 3. Referring to FIG. 4, the bandgap circuit 300 includes the bandgap reference voltage generator 310, the bias and modulation current generator 320, and a power save controller 330.

The bandgap reference voltage generator 310 includes a voltage generation unit 312 and an operational amplification unit 314. The voltage generation unit 312 receives a power supply voltage VCC and generates a bandgap reference voltage REF, which is always maintained to be constant even with external changes. To do this, the voltage generation unit 312 includes PMOS transistors MP10, MP11, MP13 and MP14, PNP transistors QN11 through QN19, resistors R10 through R19 and capacitors C10 and C11.

To be more specific, the voltage generation unit 312 senses and compensates for variances in the bandgap reference voltage REF due to external changes such as dissemination of resistance, a change in power supply voltage, a change in temperature, or a change in the characteristics of a transistor. A first node N1, which operates as a basis of the voltage generation unit 312, has a potential which is determined by a voltage applied to the gate of the transistor MP14. A current flowing through the transistor MP14 is controlled by the voltage between the gate and source of the transistor MP14. The bandgap reference voltage REF is determined to be the value of the voltage of the first node N1, which is divided by the resistors R18 and R20. Voltages RMOD and RBIA applied to the external resistors R30 and R31 are compensated to a constant voltage level since a feed back loop is formed by the operational amplifiers 46 and 48. If the power supply voltage, the temperature, the amplification coefficient of a transistor, or the resistance dissemination is changed, the voltage of the first node N1 is changed. Here, the transistors QN11 and QN12, the bases of which are connected to the ends of the resistors R16 and R17, respectively, the other ends of the resistors are connected to the first node N1, sense and compensate for each of the variations. That is, when variations are sensed by the transistors QN11 and QN12, the voltage (Vgs) between the gate and the source of the PMOS transistor MP11 is changed. Here, assuming that the variation of the voltage between the gate and source is ΔV, the voltage between the base and emitter of the NPN transistor QN15 is changed by ΔV. Hence, the potential of the third node N3 is changed, and consequently the voltage of the third node N3 is changed by ΔV. At this time, the voltage of the third node N3 is applied to the gate of the PMOS transistor MP13, so that when the voltage of the third node N3 is changed, a current flowing through the PMOS transistor MP13 can also be changed. Therefore, the direct current potential of the second node N2 connected to the source of the PMOS transistor MP13 is changed. The second node N2 is connected to the gate of the PMOS transistor MP14, such that when the direct potential of the second node N2 is changed, the voltage between the gate and source of the transistor MP14 is changed. Thus, the potential of the first node N1 connected to the drain of the transistor MP14 is compensated in correspondence with the variation of the voltage of the second node N2. Consequently, the voltage of the third node N3, which is varied under the influence of resistance dissemination, a power supply voltage, a temperature change, or the amplification coefficient of a transistor, can be compensated by the variation while passing through the second and first nodes N2 and N1. Therefore, the bandgap reference voltage REF is maintained at a constant level by the compensation of the voltage of the first node N1.

The operational amplification unit 314 amplifies the bandgap reference voltage REF generated by the voltage generation unit 312, the voltage RBIA applied to the external bias resistor R30, and the voltage RMOD applied to the modulation resistor R31 to obtain first and second output voltages VO1 and VO2. To achieve this, the operational amplification unit 314 includes PMOS transistors MP15 and MP16 and operational amplifiers 46 and 48.

In the operational amplification unit 314, the bandgap reference voltage REF is applied to the positive input port of each of the first and second operational amplifiers 46 and 48. The voltage RBIA applied to the external bias resistor R30 is applied to the negative input port of the operational amplifier 48. Also, the voltage RMOD at the external modulation resistor R31 is applied to the negative input port of the operational amplifier 46. The result VO1 amplified by the first operational amplifier 46, and the result VO2 amplified by the second operational amplifier 48, are fed back to the negative input ports of the first and second operational amplifiers 46 and 48, respectively, so that the output voltages VO1 and VO2 are maintained at a constant value. Accordingly, the bias voltage RBIA and the modulation voltage RMOD are always maintained to be constant. However, when the resistance value of the external bias resistor R30 or the external modulation resistor R31 varies, the amount of current flowing through the ports for the voltages RBIA and RMOD is changed. Thus, the amount of current output via the operational amplifier 46 or 48 can vary. Here, in each of the PMOS transistors MP15 and MP16, the voltage between its gate and source is changed according to the voltage of the second node N2 of the voltage generator 312. A current flowing into the drain of each of the transistors MP15 and MP16 is applied as a bias current for the operational amplifiers 46 and 48.

In the bandgap circuit 300 of FIG. 4, the bias and modulation current generator 320 feeds the first and second output voltages VO1 and VO2 back to the bandgap reference voltage generator 310. Thus, the first and second output voltages VO1 and VO2 are maintained to be constant, and the modulation voltage RMOD and the bias voltage RBIA are also maintained to be constant. The bias current VBIA and the modulation current VMOD are varied by the resistance of the bias resistor or the modulation resistor.

The operation of the bias and modulation current generator 320 will now be described in more detail. In the bias and modulation current generator 320, when the value of the bias resistor R30 is changed, a current output from the operational amplifier 48 is changed. Accordingly, the base current of the transistor QN20 varies. Thus, the amount of current flowing through the transistors QN20 and QN21 is varied, so that the amount of current flowing through the transistor MP17 is changed. Thus, the bias current VBIA output to the laser driver 340 is changed. Also, when the modulation resistor R31 is changed, a current output from the operational amplifier 46 is changed. At this time, the base current of the transistor QN22 is varied, so that a current flowing through the transistors QN22 and QN23 is changed. Accordingly, the amount of current flowing through the transistor MP20 is changed, so that the modulation current VMOD applied to the laser driver 340 (see FIG. 3) varies. In the present invention, VCC can be set to be 3.3V to be used as a low voltage, and the bandgap reference voltage REF can be set to be about 1V. Here, if the resistance of the external bias resistor or the modulation resistor is 10 kΩ, a current of about 100 uA is transmitted via VBIA or VMOD.

The power save controller 330 of FIG. 4 converts the bandgap circuit 300 into a sleep mode in response to an externally-input power save control signal PDB, in order to minimize power consumption. To achieve this, the power save controller 330 includes inverters 42 and 44, which are connected to each other in series, and PMOS transistors MP12, MP18 and MP19.

If the externally-input power save control signal PDB is inactivated to a high level, the transistors MP12, MP18 and MP19 are turned off. Also, if the externally-input power save control signal PDB is activated to a low level, the transistors MP12, MP18 and MP19 are turned on. As described above, if the power save control signal PDB is activated, the levels of the third node N3 and the current output nodes VBIA and VMOD are fixed to high levels. Accordingly, the bandgap reference voltage generator 310 and the bias and modulation current generator 320 are converted into a sleep mode without being operated.

Figure 5:
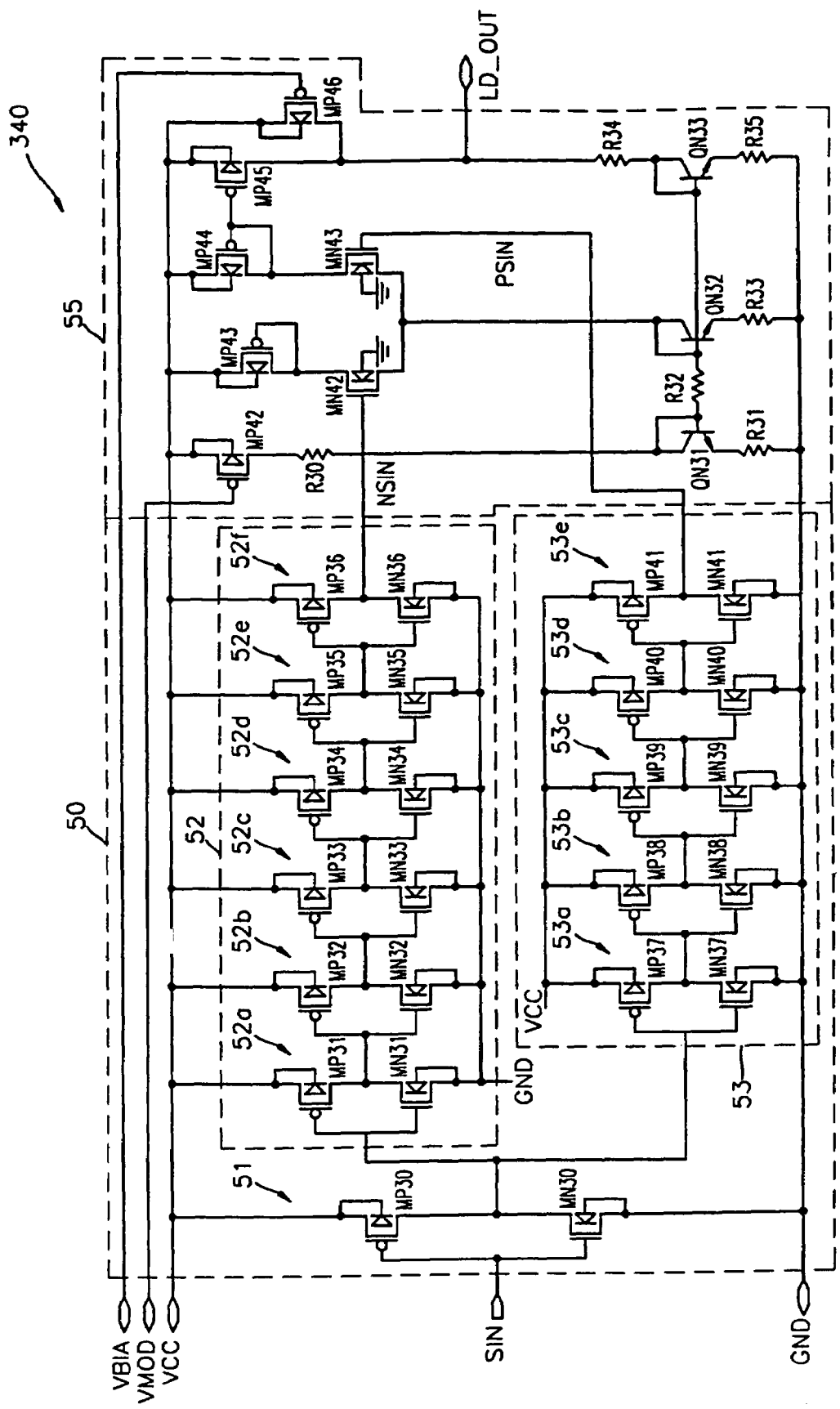
FIG. 5 is a circuit diagram illustrating the laser driver in the optical driver shown in FIG. 3 in detail.

FIG. 5 is a circuit diagram illustrating the laser driver 340 in the optical driver 260 shown in FIG. 3 in detail. Referring to FIG. 5, the laser driver 340 includes a data separation unit 50 and a voltage-to-current conversion and current driving unit 55.

The data separation unit 50 separates each channel data into a non-inversion signal and an inversion signal to obtain a non-inversion output signal and an inversion output signal. To achieve this, the data separation unit 50 includes an inverter 51 and first and second separators 52 and 53.

The inverter 51 includes a PMOS transistor MP30 and an NMOS transistor MN30, and inverts received channel data SIN and outputs the result of inversion. The first separator 52 includes six inverters 52a through 52f connected to each other in series, to obtain data NSIN the phase of which is inverted with respect to the original data SIN. Each of the inverters 52a through 52f includes a PMOS transistor and an NMOS transistor.

The second separator 53 includes five inverters 53a through 53e, which are connected to each other in series, to obtain a non-inversion signal PSIN having the same phase as the phase of the original input data SIN. Each of the inverters 53a through 53e includes a PMOS transistor and an NMOS transistor. As described above, the data separation unit 50 separates input data SIN into a non-inversion signal and an inversion signal, thereby improving the rising/falling time characteristics of data.

Here, the first and second separators 52 and 53 in the data separation unit 50 can have different numbers of inverters. However, data transmission is performed at high speed, and the delay times of the two separators is designed to be the same. Thus, the width and length of a transistor channel are determined in consideration of the ratio of the sizes to the speeds of transistors constituting each of the first and second separators 52 and 53. Hence, the first and second separators 52 and 53 in the data separation unit 50 are realized so that the data transmission time delay of input data SIN having a low frequency is the same as that of input data SIN having a high frequency.

The voltage-to-current conversion and current driving unit 55 of FIG. 5 calculates the voltage difference between the non-inversion output signal and the inversion output signal which are obtained by the data separation unit 50, produces a current corresponding to the voltage difference, and adds the current to a bias current and a modulation current, to obtain a driving current LD_OUT. To achieve these functions, the voltage-to-current conversion and current driving unit 55 includes PMOS transistors MP42 through MP46, NMOS transistors MN42 and MN43, NPN transistors QN31, QN32 and QN33, and resistors R30 through R35.

In the voltage-to-current conversion and current driving unit 55, the NMOS transistors MN42 and MN43 operate as comparators. That is, the non-inversion output signal and the inversion output signal output from the data separation unit 50 are compared to each other by the NMOS transistors MN42 and MN43, so that the voltage difference is calculated. At this time, the voltage difference is converted into a current, and the current is mirrored by the PMOS transistors MP44 and MP45 having a current mirror structure. For example, when the voltage level of data output from the first separator 52 is greater than that of the output of the second separator 53, a current flowing through the PMOS transistor MP43 is increased by the level difference. On the other hand, when the voltage level of data output from the second separator 53 is greater than that of the output of the first separator 52, a current flowing through the PMOS transistor MP44 is increased by the level difference. At this time, a current determined by the input data SIN is controlled by the modulation current VMOD or the bias current VBIA obtained by the bandgap circuit 300, and finally output as a driving current LD_OUT.

The laser driver 340 will now be described in further detail. The modulation current VMOD is transmitted to the PMOS transistor MP42, and a current, which is proportional to the size of the PMOS transistor MP42, flows therethrough. The bias current VBIA is transmitted to the PMOS transistor MP46, and a current, which is proportional to the size of the PMOS transistor MP46, flows therethrough. If the resistor R31 has a resistance that is twice as large as the resistance of the resistor R33, and if the PMOS transistor MP45 is five times as large as the PMOS transistor MP44, a current flowing through the transistor QN32 is about twice as large as the current flowing through the transistor QN31. Thus, the current of the transistor QN32 that is twice that of the transistor QN31 is transmitted to the PMOS transistor MP44. At this time, the current transmitted to the PMOS transistor MP44 is increased five times by the PMOS transistor MP45 which is five times as large as the PMOS transistor MP44. Thus, the swing scope of current of input data SIN, which is obtained by the modulation current VMOD, that is, a current flowing through the PMOS transistor MP45, is increased to ten times the modulation current VMOD. This modulation current is mixed with a DC current flowing in proportion to the size of the PMOS transistor MP46 in response to the bias current VBIA, and thus output as a laser diode driving current LD_OUT.

Figure 6A:
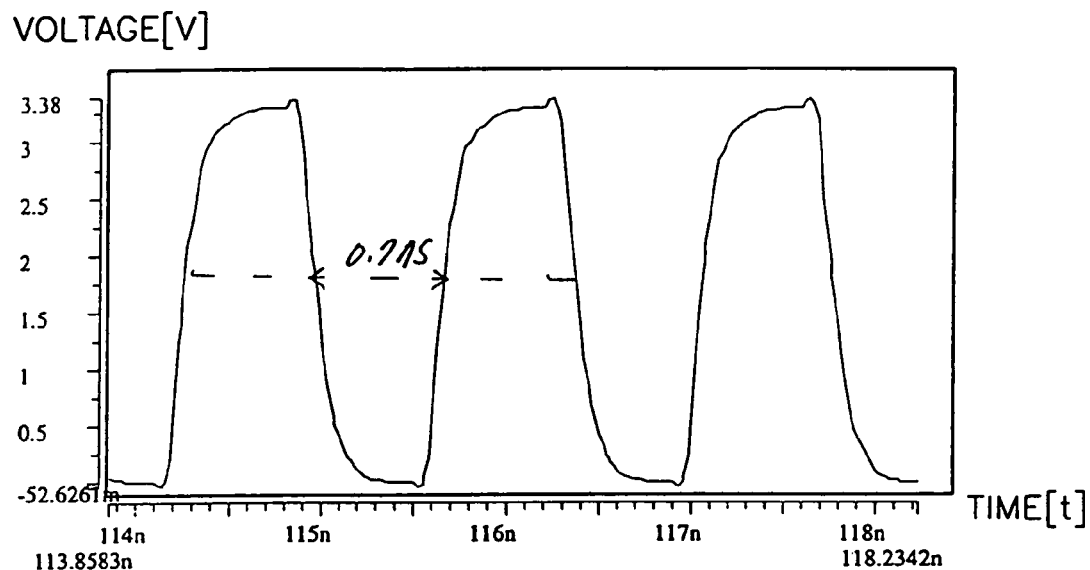
FIGS. 6A, 6B and 6C are waveform views for illustrating the operation of the laser driver shown in FIG. 5.
Figure 6B:
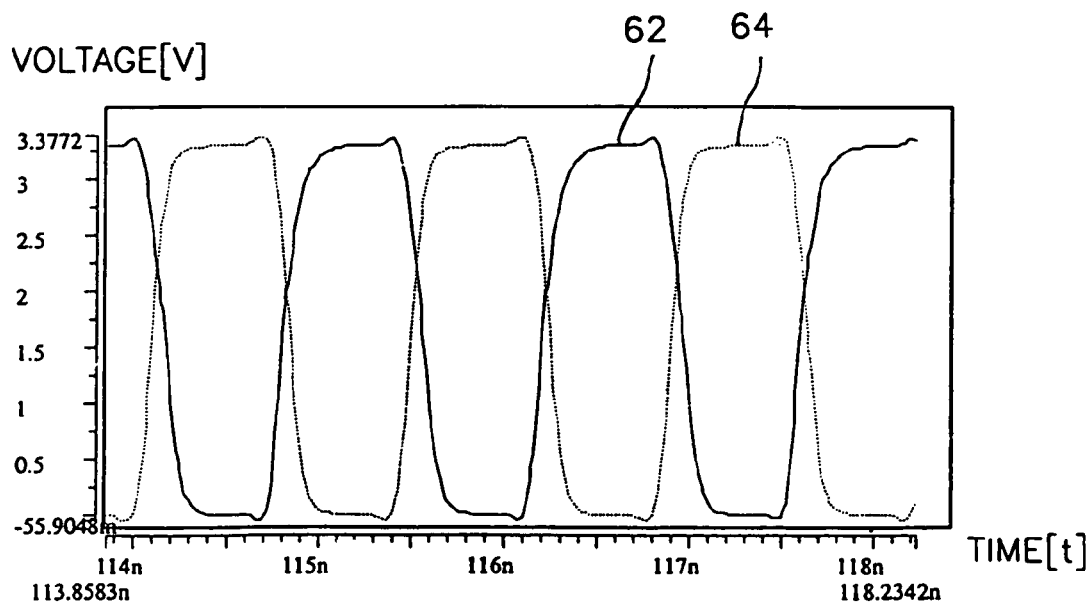
Figure 6C:
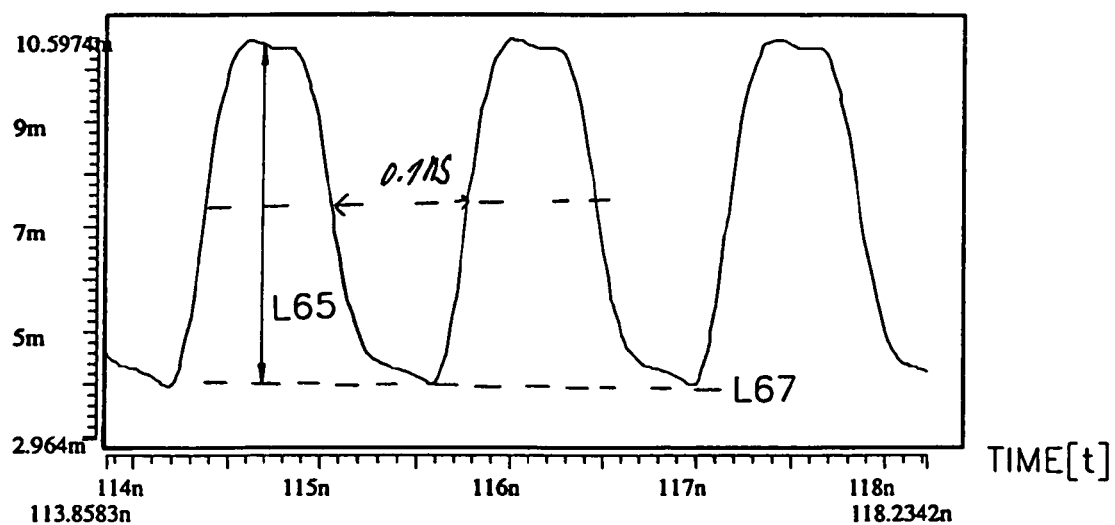
Figure 7A:
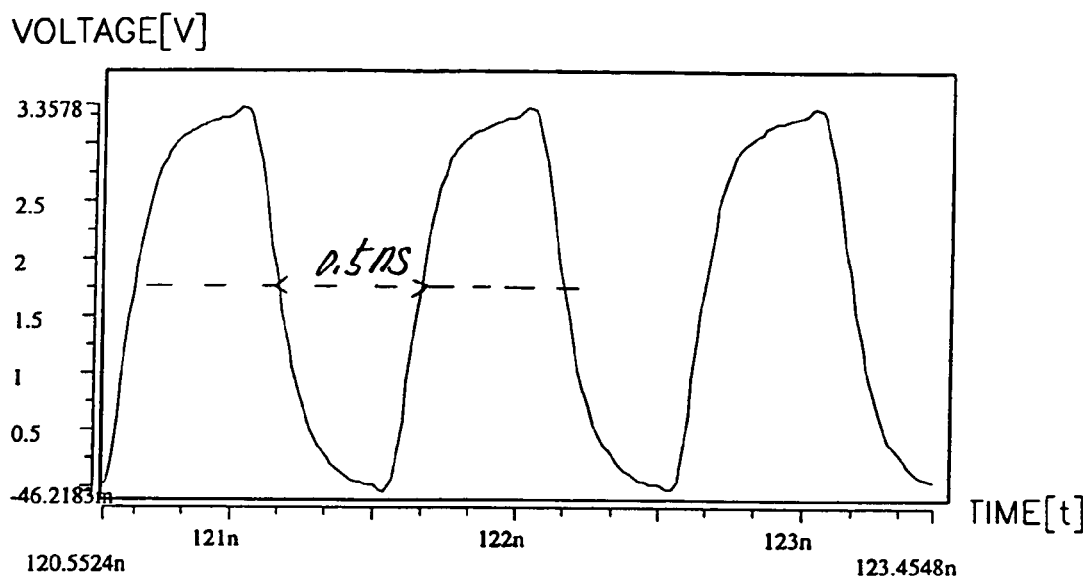
FIGS. 7A, 7B and 7C are other types of waveform views for illustrating the operation of the laser driver shown in FIG. 5.
Figure 7B:
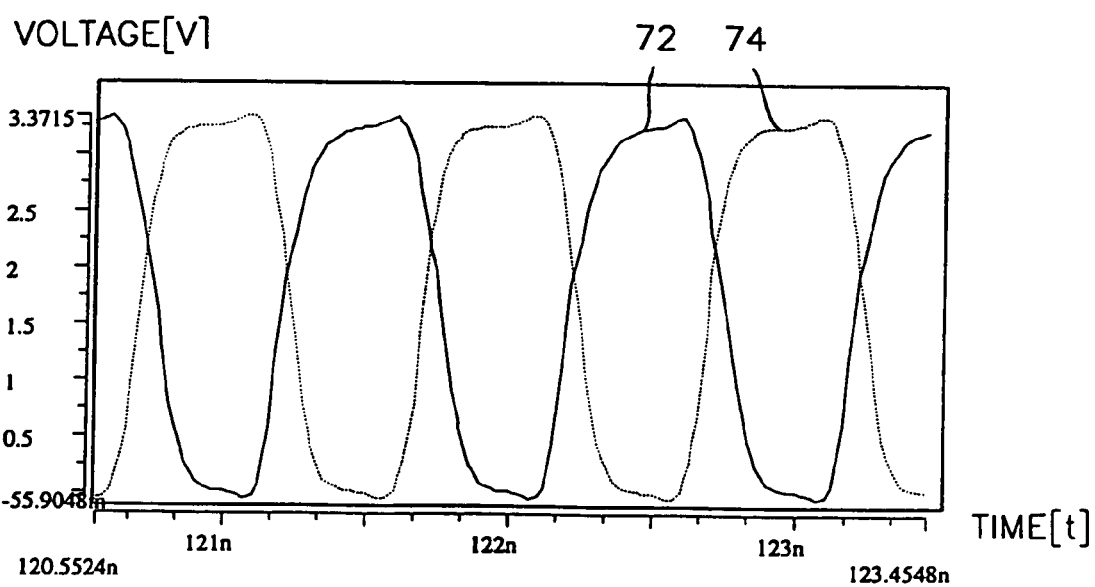
Figure 7C:
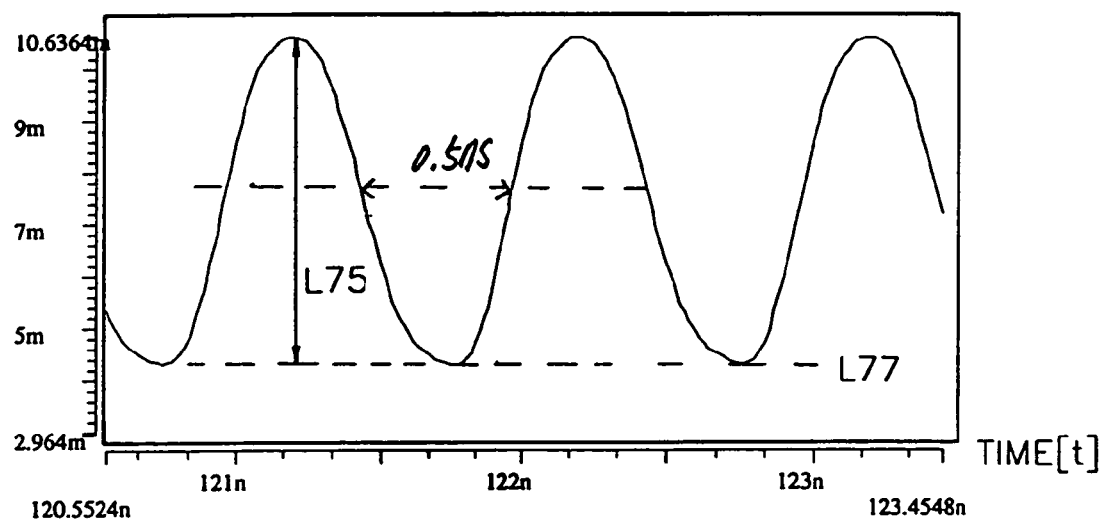

FIGS. 6A through 6C and 7A through 7C are waveform views for illustrating the operation of the laser driver 340 shown in FIG. 5. FIGS. 6A and 7A show received channel data SIN, FIGS. 6B and 7B show variations in the signals NSIN and PSIN output from the first and second separators 52 and 53, respectively, in the data separator unit 50, and FIGS. 6C and 7C show variations in the laser diode driving current LD_OUT.

In FIGS. 6B and 7B, reference numerals 62 and 72 denote the output signal NSIN of the first separator 52, and reference numerals 64 and 74 denote the output signal PSIN of the second separator 53. In FIGS. 6C and 7C, reference numerals L65 and L75 denote the swing scope of the laser diode driving current LD_OUT, and L67 and L77 denote the bias level of the laser diode driving current LD_OUT.

FIGS. 6A, 6B and 6C refer to the case in which the laser driver 340 receives a duty clock signal of 1.429 Gbps as input data SIN. As shown in FIG. 6, the input data has a duty width of 0.7 ns. Also, the rising/falling time of the input data SIN is set to have a 0.1 ns margin. In FIG. 6B, the output signals 62 and 64 of the first and second separators 52 and 53, respectively, have mutually-inverted phases.

FIGS. 7A, 7B and 7C refer to the case in which the laser driver 340 receives a duty clock signal of 2 Gbps as input data SIN. As shown in FIG. 7A, the clock signal has a duty width of 0.5 ns. As descried above, the current bias level and the current swing width of the input data SIN are determined by the bias current VBIA and the modulation current VMOD.

Figure 8:
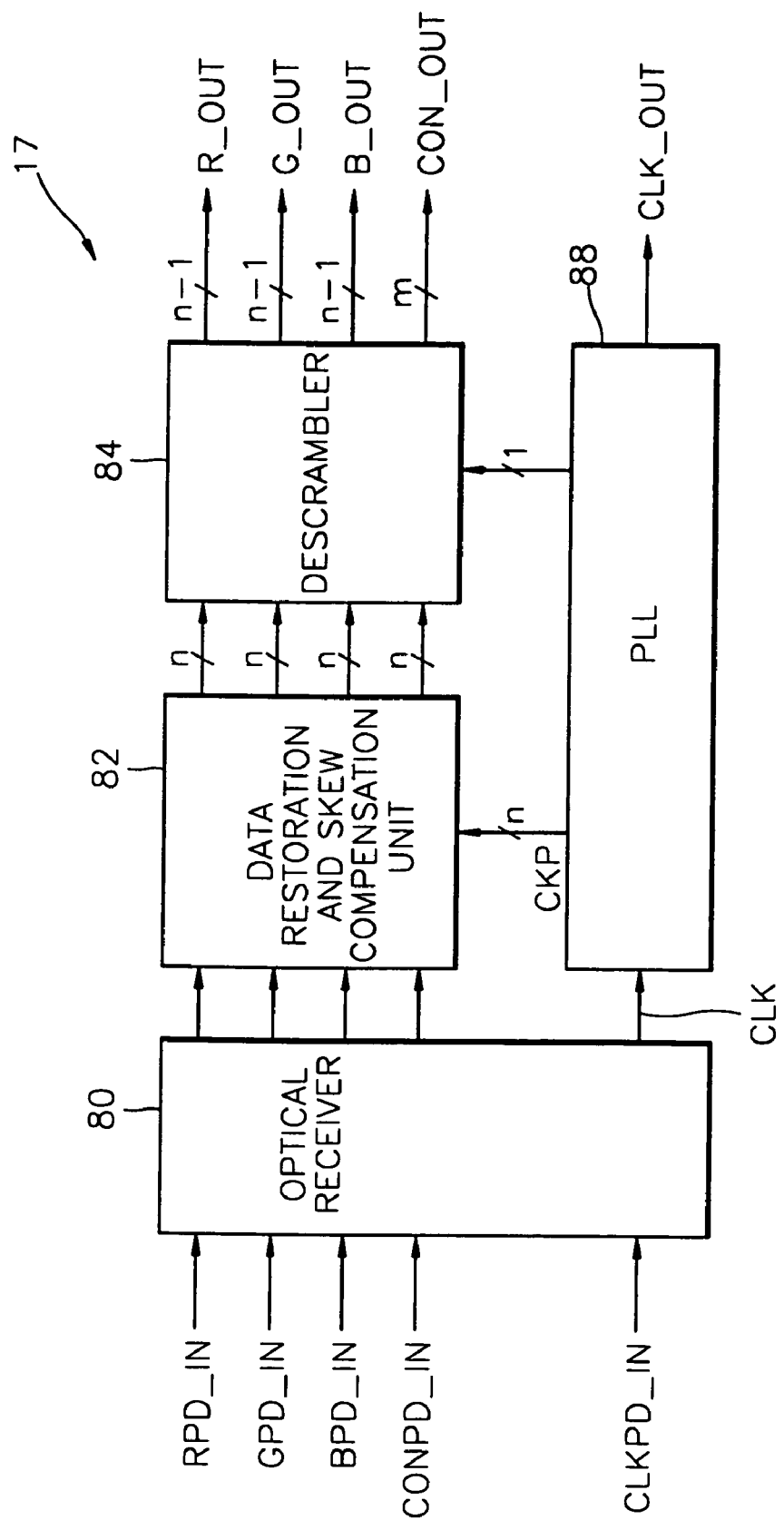
FIG. 8 is a block diagram of the receiver of the optical transfer system shown in FIG. 1.

A receiver in an optical transfer system according to the present invention will now be described with reference to the attached drawings. Referring to FIG. 8, which is a block diagram of the receiver 17 of the optical transfer system shown in FIG. 1, the receiver 17 includes an optical receiver 80, a data restoration and skew compensation unit 82, a descrambler 84, and a phase locked loop (PLL) 88.

The optical receiver 80 converts a current, into which a signal is converted, received from an optical reception diode such as a photo diode, into a voltage, and duty-compensates and level-converts the voltage, thereby outputting a digital signal. Here, the output signal can be an R/G/B color signal, a control signal CON, and a clock signal CLK.

The PLL 88 receives a clock signal CLK from the optical receiver 80, generates a clock signal which synchronizes with the clock signal CLK, and outputs the clock signal to each block. Also, the PLL 88 produces non-overlapping clock signals CKP for data compression release performed by the data restoration and skew compensation unit 82.

The data restoration and skew compensation unit 82 deserializes data compressed and serialized by the transmitter 12 (see FIG. 1) into the original signal, that is, a parallel signal, in response to a non-overlapping clock signal CKP output from the PLL 88, and compensates for a skew if a skew is generated. That is, the data restoration and skew compensation unit 82 restores the compressed data into parallel data of a predetermined number of bits.

The descrambler 84 receives signals of a predetermined number of bits restored by the data restoration and skew compensation unit 82, and accurately distinguishes between a high level section and a low level section using DC balance information attached to the head of the restored data bit. Data output from the descrambler 84 may comprise R/G/B output signals R_OUT, G_OUT and B_OUT, a control signal CON-OUT, and a clock signal CLK_OUT.

Figure 9:
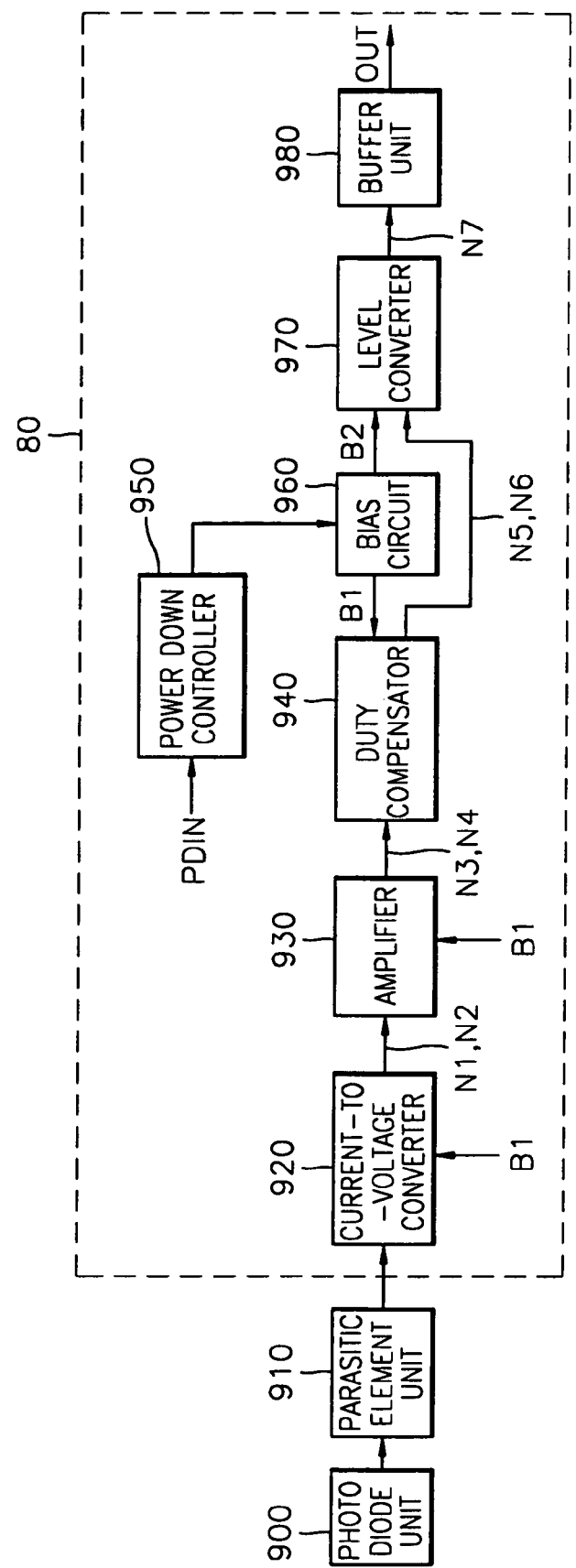
FIG. 9 is a block diagram of the optical receiving unit of the receiver shown in FIG. 8.

FIG. 9 is a block diagram of the optical receiver 80 shown in FIG. 8. Referring to FIG. 9, the optical receiver 80 includes a current-to-voltage converter 920, an amplifier 930, a duty compensator 940, a power down controller 950, a bias circuit 960, a level converter 970 and a buffer unit 980. For convenience of explanation, a photo diode unit 900 and a parasitic element unit 910 are shown.

The photo diode unit 900 converts an optical signal received from the transmitter 12 (see FIG. 1) via the optical transmission path 15 (see FIG. 1) into an electrical signal. The parasitic element unit 910 is modeled with parasitic elements predicted when a current signal is transmitted from the external photo diode unit 900 to the inside of the optical receiver 80.

In the optical receiver 80 of FIG. 9, the bias circuit 960 receives a predetermined current from a power supply voltage to produce first and second bias currents B1 and B2.

The current-to-voltage converter 920 sources a current in response to the first bias current B1, and converts the current signal received from the photo diode 900 into a differential voltage signal. In FIG. 9, reference characters N1 and N2 denote signal lines for outputting the differential voltage signal of the current-to-voltage converter 920.

The amplifier 930 sources a current in response to the first bias current B1, and amplifies a received signal which has been converted into a differential signal, thereby outputting an amplified differential signal. In FIG. 9, reference numerals N3 and N4 denote signal lines for outputting the amplified differential signal of the amplifier 930.

The duty compensator 940 sources a current in response to the first bias current B1, and produces a differential output signal corresponding to the results of a comparison of the output signal of the amplifier 930 with a predetermined reference voltage. That is, the duty compensator 940 is configured with a comparator of a current summing structure, and compensates for the duty of a received signal. Here, the output signal of the duty compensator 940 becomes differential output signal N5 and N6 which are represented with an input signal and the inverted signal of the input signal. A switching point can be changed when the threshold voltage of a transistor varies with temperature and other conditions. Accordingly, the duty compensator 940 is installed to prevent the duty of its output signal from being changed by a change in the switching point. In FIG. 9, reference characters N5 and N6 each indicate a line for the differential output signal of the duty compensator 940.

The level converter 970 sources a current in response to a second bias current B2, and converts the voltage levels of the first and second output signals N5 and N6 output from the duty compensator 940, thereby outputting a signal of a digitalized transistor—transistor logic (TTL) level. In FIG. 9, reference character N7 indicates a line for the output signal of the level converter 970.

The buffer unit 980 buffers a signal output from the level converter 970 to produce a digitalized output signal OUT. At this time, the buffer unit 980 enhances the output driving capability by outputting a signal whose level has been amplified by a predetermined level with respect to the received signal. Here, the output signal OUT of the buffer unit 980 can be an R, G or B signal, a control signal CON or a clock signal CLK.

The power down controller 950 controls the bias circuit 960 so that the bias circuit 960 is not driven in response to a power down control signal PDIN which is applied from an external source. Thus, all of the other blocks do not operate in a power down mode, thereby reducing power consumption.

Figure 10:
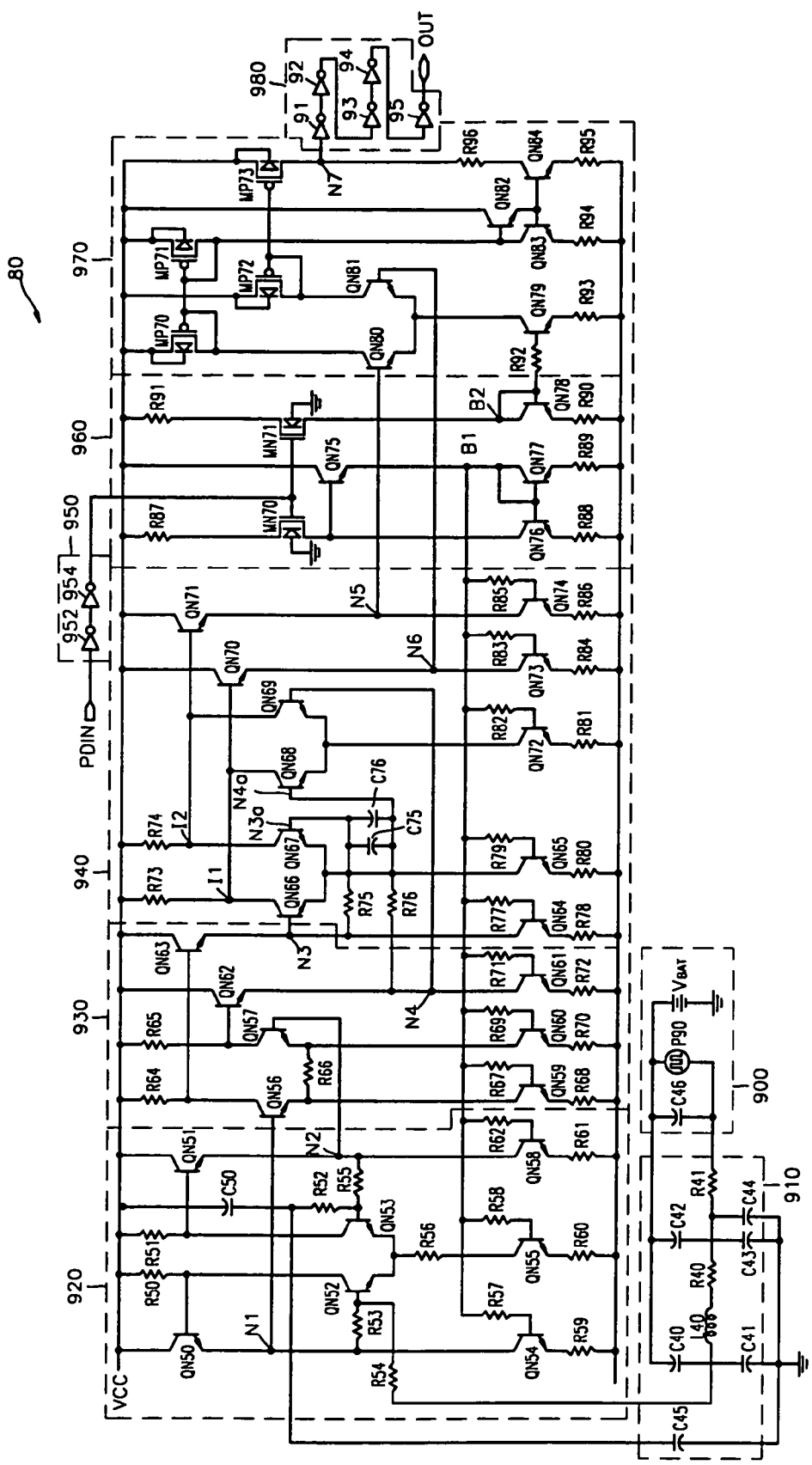
FIG. 10 is a detailed circuit diagram of the optical receiving unit shown in FIG. 9.

FIG. 10 is a detailed circuit diagram of the optical receiving unit 80 shown in FIG. 9. A photo diode unit 900 shown in FIG. 10 is obtained by modeling an actual light receiving diode, for example, a photo diode. That is, a pulse generator P90 of FIG. 10 produces a current which is the same type as a current output from a photo diode. A capacitor C46 connected to both ends of the pulse generator P90 represents the parasitic capacitor component of the photo diode. A voltage source $V_{BAT}$ is set to be a voltage which has the same level as the level of a power supply voltage VCC, since the photo diode is connected to the VCC on a real circuit.

In a parasitic element unit 910 shown in FIG. 10, capacitors C40 through C45, resistors R40 and R41 and a coil L40 represent parasitic elements when the external photo diode unit 900 transfers a current signal into the optical receiving unit 80. As in the present invention, a circuit is designed in consideration of the influence of the parasitic elements in a system in which data is processed at a rate of several Gbps. Also, the capacitor C45 is a parasitic capacitor corresponding to the parasitic capacitance of a pad to which a signal is applied. However, upon practical designing of a circuit, the circuit is realized with a dummy pad, which has the same structure as that of an input pad, to produce a differential voltage signal from an input current. As described above, the parasitic element unit 910 is obtained by modeling parasitic elements which can be generated by a lead frame, a bonding wire or a pad which are in a package assembled state, when a receiving chip is integrated.

A current-to-voltage converter 920 of FIG. 10 converts a current signal received from the photo diode unit 900 via the parasitic element unit 910 into a differential voltage signal. To do this, the current-to-voltage converter 920 includes NPN transistors QN50 through QN55 and QN 58, resistors R50 through R62, and a capacitor C50. The transistors QN52 and QN53 output a current signal as a differential voltage. That is, the collector current of QN52 is changed by an input current which is applied via the resistor R54, and accordingly, the voltage of a first node N1 is changed. Here, the transistor QN53 produces a reference signal to produce a differential signal corresponding to the voltage of the first node N1. That is, the voltage of the second node N2 of FIG. 10 becomes the reference signal. Here, the resistor R54 is included to protect the optical receiver against electrostatic discharge (ESD). The capacitor C50 is included to be matched with the capacitor C46 in the photo diode unit 900. The resistor R53 between the base of the transistor QN52 and the emitter of the transistor QN50 determines the gain upon conversion of a current into a voltage. Also, the resistors R52 and R55 connected to the base of the transistor QN53 are matched with the resistors R54 and R53, respectively. The transistors QN50 and QN51 are connected between a power supply voltage VCC and the collector of the transistors QN54 and QN58, respectively, such that a predetermined current is received from the power supply voltage VCC. The direct current level of a signal received from the amplifier 930 is determined by the resistors R50 and R51. The transistors QN54, QN55 and QN58 act as current sources for allowing a reference current to flow in response to the bias current B1 applied from the bias circuit 960.

The amplifier 930 of FIG. 10 includes resistors R64 through R72 and NPN transistors QN56 through QN63. In the amplifier 930, the NPN transistors QN56 and QN57 receive the voltages of the first and second nodes N1 and N2 via their bases, respectively, and differentially amplify the received voltages. The results of the amplification are output to the third and fourth nodes N3 and N4 via the transistors QN63 and QN62, respectively.

If the voltage of the first node N1 is higher than that of the second node N2, the voltage of the collector of the transistor QN56 is lowered compared to the collector voltage of the transistor QN57. At this time, the collector voltage of the transistor QN57 increases more than before, so that the voltage between the base and emitter of the transistor QN62 is increased. Also, the voltage of the fourth node N4 is increased. On the other hand, if the voltage of the second node N2 is higher than that of the first node N1, the voltage of the collector of the transistor QN57 is lowered compared to the collector voltage of the transistor QN56. At this time, the collector voltage of the transistor QN57 increases more than before, so that the voltage between the base and emitter of the transistor QN63 is increased. Also, the voltage of the fourth node N3 is increased. Here, the resistor R64 determines the amplification gain of the amplifier 930 together in cooperation with the resistor R66. That is, the amplification gain with respect to the collector voltage of the transistor QN56 can be expressed by the following Equation 1:

$$Av = \frac{R64}{\frac{R66}{2} + \gamma_{eQN56}} \qquad (1)$$

wherein $Y_{eQN56}$ denotes the emitter resistance of the NPN transistor QN56. Also, the transistors QN59 through QN61 and the resistors R67 through R72 in the amplifier 930 form a current source using the bias current B1 which is generated by the bias circuit 960.

The duty compensator 940 of FIG. 10 includes resistors R73 and R74; NPN transistors QN66 through QN71; resistors R75 and R76; transistors QN64, QN65 and QN72 through QN74; and resistors R77 through R86 which constitute a current source. That is, in the duty compensator 940, the transistors QN64, QN65 and QN72 through 74 and resistors R77 through R86 operate as a current source which receives the bias current B1. Also, a group of the transistors QN66 and QN67 and a group of transistors QN68 and QN69 is each comprised of a different comparator, which has a current summing structure.

The voltages of the third and fourth nodes N3 and N4, respectively, which are the outputs of the amplifier 930, are applied to the bases of the transistors QN66 and QN69, respectively. Also, the voltage of the third node N3 is differentiated by the resistor R75 and the capacitor C75 and applied as a first reference voltage to the base of the transistor QN67. Referring to FIG. 10, the first reference voltage is defined as a voltage which is loaded on a node N3a. Similarly, the voltage of the fourth node N4 is differentiated by the resistor R76 and the capacitor C76 and applied as a second reference voltage to the base of the transistor QN68. Likewise, the second reference voltage is defined as a voltage which is loaded on a node N4a. In the present invention, the optical transfer system operates at a speed of several Gbps, so that values R and C for determining a time constant are appropriately set according to the speed. In particular, the capacitors C75 and C76 are set to have values of 40 pF or greater.

As described above, the comparison voltage of each comparator is set to be an integration value with respect to a received signal in proportion to various received signals. Also, the transistor QN70, which receives the output of the first comparator via its base, produces an output signal and applies it to a sixth node N6. Similarly, the transistor QN71, which receives the output of the second comparator via its base, produces an output signal and applies it to a fifth node N5.

In the operation of the duty compensator 940, first, the first current I1 of the duty compensator 940 can be defined by the following Equation 2:

$$I1 = I_{CQN66}\left(= I_{SQN66}\exp\left(\frac{V_{BEQN66}}{V_T}\right)\right) + I_{CQN68}\left(= I_{SQN68}\exp\left(\frac{V_{BEQN63}}{V_T}\right)\right) \qquad (2)$$

wherein $I_{CQN66}$ denotes the collector current of the transistor QN66, $I_{SQN66}$ denotes the saturation current of the transistor QN66, and $V_{BEQN66}$ denotes a voltage between the base and emitter of the transistor QN66. Parameters for the transistor QN68 can be defined in the same manner as described above. In this way, the first current I1 is defined as the sum of the collector currents of the transistors QN66 and QN68.

Also, a second current I2 can be expressed by the following Equation 3:

$$I2 = I_{CQN67}\left(= I_{SQN67}\exp\left(\frac{V_{BEQN67}}{V_T}\right)\right) + I_{CQN69}\left(= I_{SQN69}\exp\left(\frac{V_{BEQN69}}{V_T}\right)\right) \qquad (3)$$

wherein $I_{CQN67}$ denotes the collector current of the transistor QN67, $I_{SQN67}$ denotes the saturation current of the transistor QN67, and $V_{BEQN67}$ denotes a voltage between the base and emitter of the transistor QN67. Parameters for the transistor QN69 can also be defined in the same method as described above. In this way, the second current I2 is defined as the sum of the collector currents of the transistors QN67 and QN69. Thus, a voltage loaded on the resistor R73, that is, the base voltage of the transistor QN70, and a voltage loaded on the resistor R74, can each be obtained by the following Equation 4:

$$V_{R73} = VCC - (R73 * I1)$$
$$V_{R74} = VCC - (R74 * I2) \qquad (4)$$

As shown in Equation 4, the voltages loaded on the resistors R73 and R74, respectively, vary with the current values I1 and I2. Thus, the voltage between the base and emitter of each of the transistors QN70 and QN71 also varies. That is, it is apparent that the potentials of the output nodes N6 and N5 are varied according to the currents I1 and I2.

If the voltage of the third node N3 is higher than that of the fourth node N4, most of the current I1 flows through the transistor QN66. At this time, the collector voltage of the transistor QN66 decreases, but the collector voltage of the transistor QN69 relatively increases. Thus, a greater amount of current flows through the transistor QN71, so the voltage of the fifth node N5 is increased. On the other hand, if the voltage of the fourth node N4 is higher than that of the third node N3, most of the current I2 flows through the transistor QN67. At this time, the collector voltage of the transistor QN69 decreases, but the collector voltage of the transistor QN66 increases. Thus, the voltage of the sixth node N6 is increased. The duty compensator 940 accurately compensates for the duty of an output signal by using differential signals.

The bias circuit 960 of FIG. 10 includes resistors R87 through R91, NMOS transistors MN70 and MN71, and NPN transistors QN76 through QN78. That is, when power is applied, in the case that the level of the power down control signal PDIN is not low, the NMOS transistors MN70 and MN71 operate, so that the transistor QN75 is turned on. That is, a current flowing through the emitter of the transistor QN75 is transferred via the transistor QN77. The collector current of the transistor QN77 is produced as the first bias current B1. Also, a current flowing to the transistor QN77 is mirrored to the transistor QN76 which has a current mirror structure with the transistor QN77. In the meantime, a current flowing to the transistor MN71 is mirrored to the transistor QN78, and the current flowing to the transistor QN78 is a second bias current B2. The second bias current B2 is applied as a bias current for the level converter 970 via the resistor R92.

Also, in the present invention, a bias current is set so that a transistor provides a maximum frequency responsiveness.

That is, a transistor provides a frequency responsiveness depending on how the amount of current is determined. Therefore, the size of a transistor is determined so that the current source in each of the blocks, which receive the bias currents B1 and B2, respectively, provides a current required according to the function of each of the blocks. Also, in order for the receiver to operate fast as in the present invention, the base resistance value and the emitter resistance value of each transistor are set so that the transistors provide maximum characteristics, thereby maximizing a current value.

The level converter 970 of FIG. 10 includes PMOS transistors MP70 through MP73, NPN transistors QN79 through QN84 and resistors R92 through R96. Also, the level converter 970 digitalizes the level of a signal and converts the digitalized level into a TTL level. The resistors R92 and R93 and the transistor QN79 in the level converter 970 act as current sources for repeating the bias current B2 which is applied from the bias circuit 960. The NPN transistors QN80 and QN81 in the level converter 970 have a differential structure in which they receive the voltages of the fifth and sixth nodes N5 and N6 from the duty compensator 940. The PMOS transistors MP70 and MP71 have a current mirror structure, and are switched on/off by the collector voltage of the transistor QN80. The PMOS transistors MP72 and MP73 have a current mirror structure, and are switched on/off by the collector voltage of the transistor QN81. Also, the transistors QN82, QN83 and QN84 and the resistors R94 through R96 allow a predetermined current to flow to ground (GND) according to a current flowing through the transistor MP71.

As described above, the level converter 970 receives a differential input signal and generates an output signal. The reason why the input signal is received in a differential form is to prevent the duty of an output signal from being changed due to an alteration in a switching point when the threshold voltage of a transistor is changed with respect to temperature and other conditions. At this time, a switched output turns the PMOS transistors MP72 and MP73 on/off, thereby producing an output voltage. The seventh node N7 of FIG. 10 denotes the output node of the level converter 970.

If the voltage of the fifth node N5 is higher than that of the sixth node N6, a current flowing via the transistor QN80 of the level converter 970 increases. Accordingly, the collector potential of the transistor QN80 decreases, and the PMOS transistors MP70 and MP71 are turned on. Here, a predetermined current flowing through the transistor MP71 is transmitted to the NPN transistors QN82, QN83 and QN84. Thus, the voltage of the seventh node N7 relatively decreases. On the other hand, if the voltage VN6 of the sixth node N6 is higher than the voltage VN5 of the fifth node N5, a current flowing through the transistor QN81 of the level converter 970 relatively increases. Thus, the collector potential of the transistor QN80 decreases, and the PMOS transistors MP72 and MP73 are turned on. At this time, the voltage of the output node N7 connected to the drain of the PMOS transistor MP73 increases.

The power down controller 950 of FIG. 10 includes inverters 952 and 954, which are connected to each other in series, and is switched in response to the power down control signal PDIN, which is externally applied. The modes of all of the circuits of the optical receiving unit 80 are set from a power down mode to a sleep mode in response to the power down control signal PDIN, and consumption of a power supply voltage is minimized. That is, the power down control signal PDIN upon normal operation is set to a high level, and the NMOS transistors MN70 and MN71 of the bias circuit 960 are turned on and operate normally. If the level of the power down control signal PDIN is set to a low level, the NMOS transistors MN70 and MN71 are turned off, so that the bias circuit 960 cannot operate normally. Therefore, the bias currents B1 and B2 are not produced, so that the modes of all of the circuits are converted into the sleep mode.

The buffer unit 980 of FIG. 10 includes inverters 91 through 95, which are connected to each other in series. Referring to FIG. 10, the buffer unit 980 includes five inverters such that a signal having an opposite phase with respect to that of the input signal of the buffer unit 980 is output. However, in view of the input signal of the optical receiving unit 80, an in-phase signal is output. Though not shown in detail, the size of each of the internal transistors constituting the inverters 91 through 95 increases by a multiple of 2 with respect to its previous inverter, thereby improving the driving capability of the output signal.

As described above, the optical receiving unit 80 changes a current signal output from a photo diode to a voltage in order to perform digital processing. Also, in the optical receiving unit 80, the level of its final output is converted into a TTL level which full swings with respect to the power supply voltage, and buffered. Furthermore, in the optical receiving unit 80, circuits are designed in consideration of the influence of parasitic elements, such that a dynamic range with respect to the input of current is extended. Also, in order to reduce power, the optical receiver 80 is designed to operate at a low voltage, and the rise/fall time and a duty margin are considered upon current-to-voltage conversion. In order to prevent noise due to the power supply voltage and the ground (GND) from being generated in the optical receiver 80 of FIG. 10, the power supply voltage VCC and the ground GND in the current-to-voltage converter 920 are separated from those in the amplifier 930. For the same reason, in the bias circuit 960, the power supply voltage VCC line and the ground GND line used by a circuit for producing the first bias current B1 are separated from those used by a circuit for producing the second bias current B2.

Figure 11A:
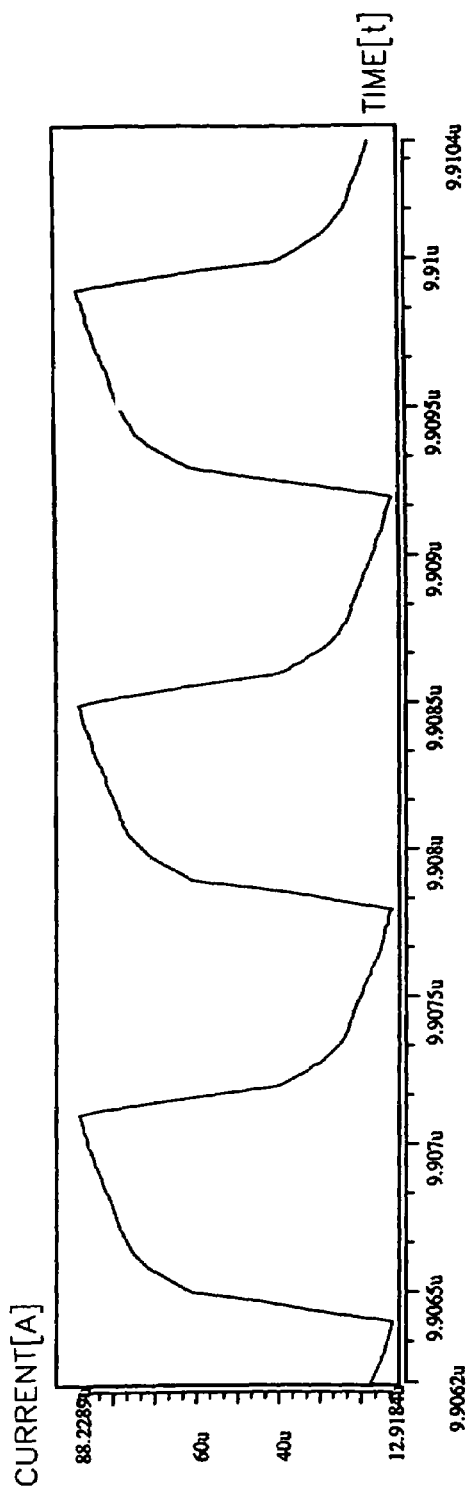
FIGS. 11A and 11B are graphs showing the waveforms representing an input signal and an output signal of the optical receiving unit shown in FIG. 10.
Figure 11B:
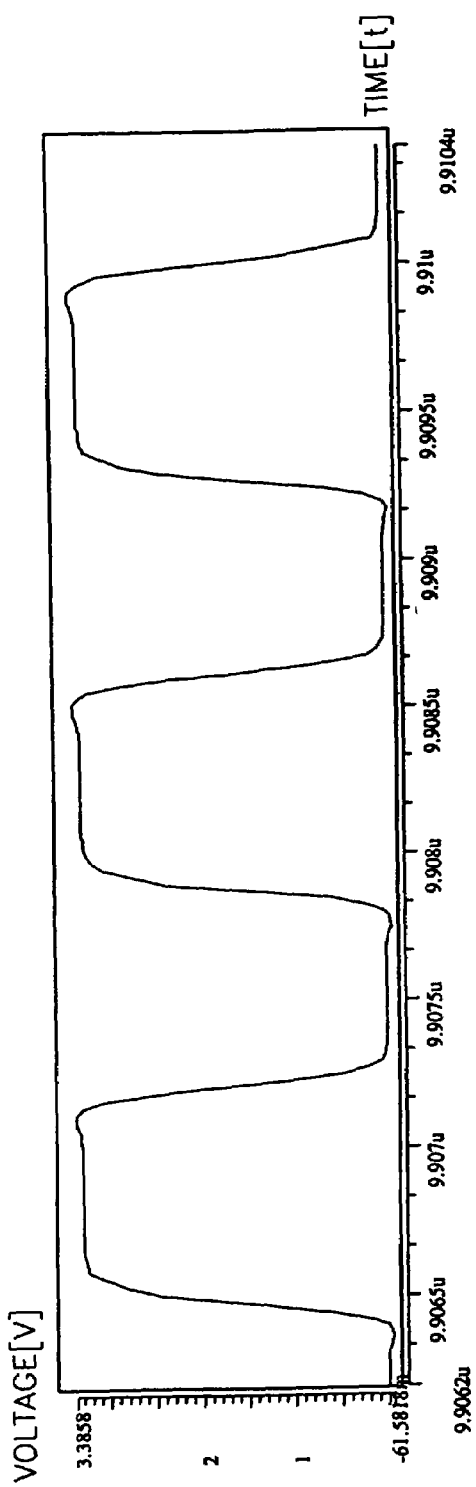

FIGS. 11A and 11B are graphs showing waveforms to explain an input and an output signal of the optical receiving unit 80 shown in FIG. 10. FIG. 11A shows a current signal which is received via the photo diode unit 900, and FIG. 11B shows a TTL level voltage signal which is finally output via the buffer unit 980.

Referring to FIG. 11A, the unclean waveform of an input current, which is a source clock signal having a peak value of 0–100 uA, indicates that the input current is influenced by the parasitic capacitor component of a photo diode. FIG. 11B shows a voltage signal which is output in a waveform from which noise due to parasitic elements is removed.

Figure 12A:
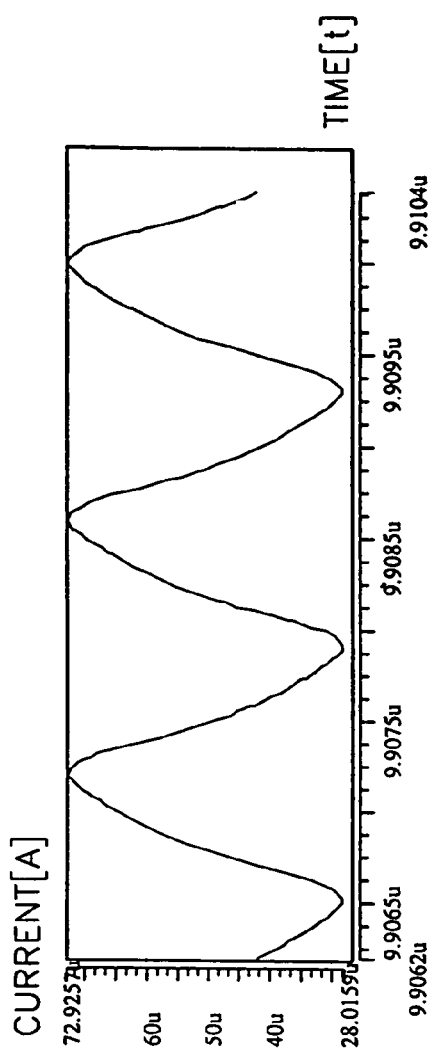
FIGS. 12A through 12D are waveform views for illustrating the operation of the optical receiving unit shown in FIG. 10.
Figure 12B:
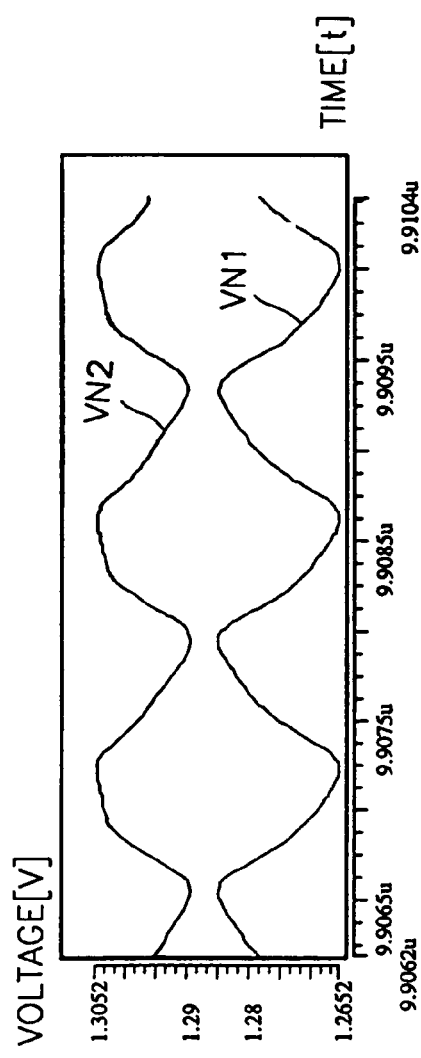

FIGS. 12A through 12D are waveform views for illustrating the operation of the optical receiving unit 80 shown in FIG. 10. FIG. 12A shows the output signal of the parasitic element unit 910, FIG. 12B shows the output signals of the current-to-voltage converter 920, and FIGS. 12C and 12D each show the output signals of the amplifier 930 and signals obtained by differentiating the output signals.

Figure 13A:
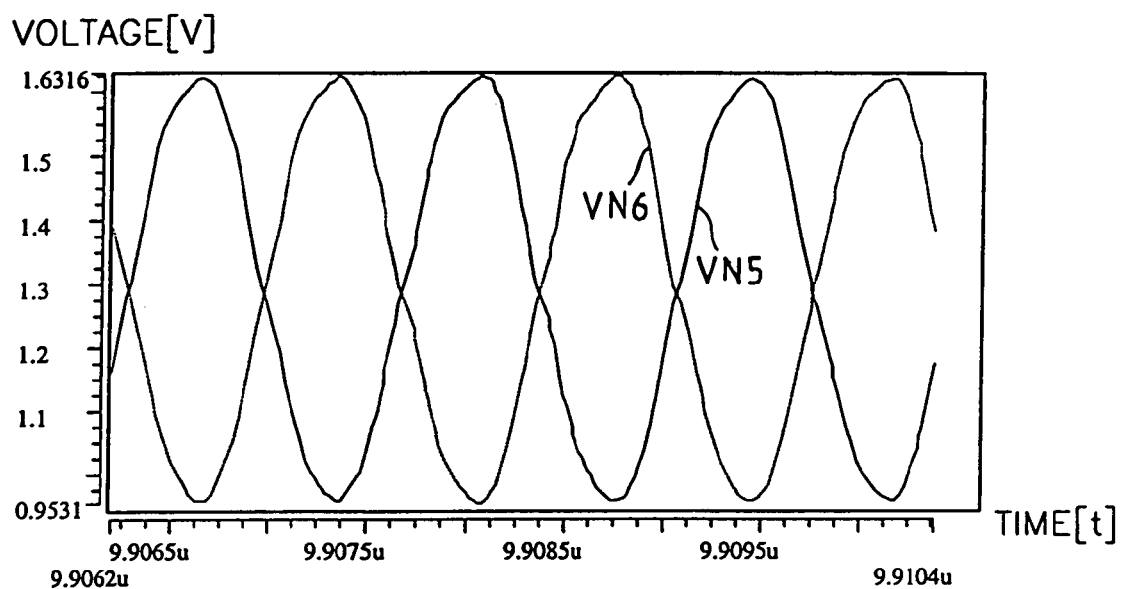
FIGS. 13A, 13B and 13C are other types of waveform views for illustrating the operation of the optical receiving unit shown in FIG. 10.
Figure 13B:
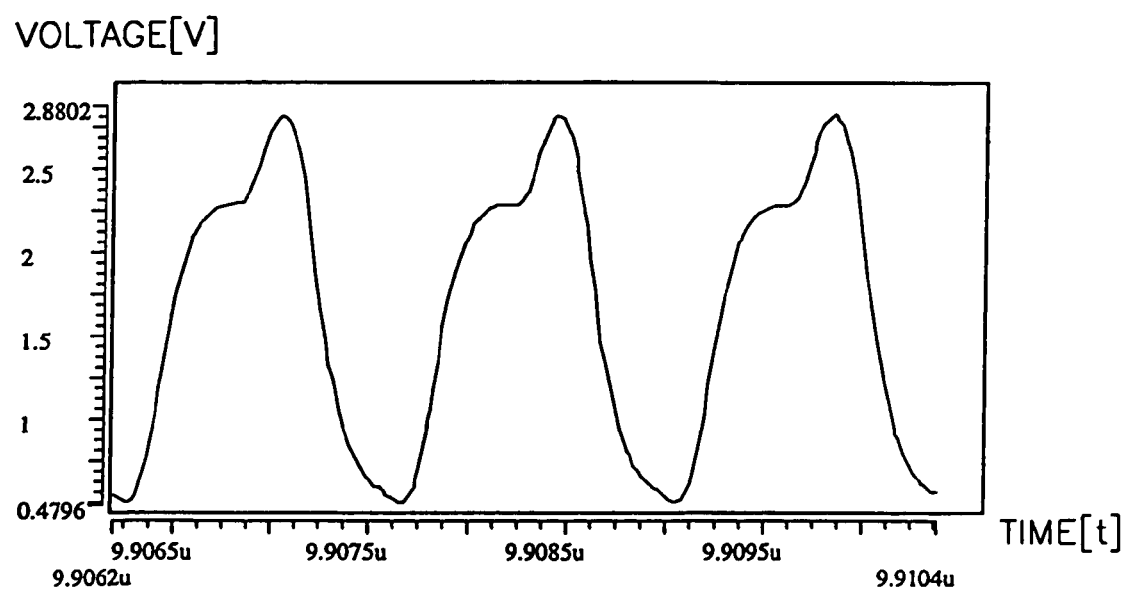
Figure 13C:
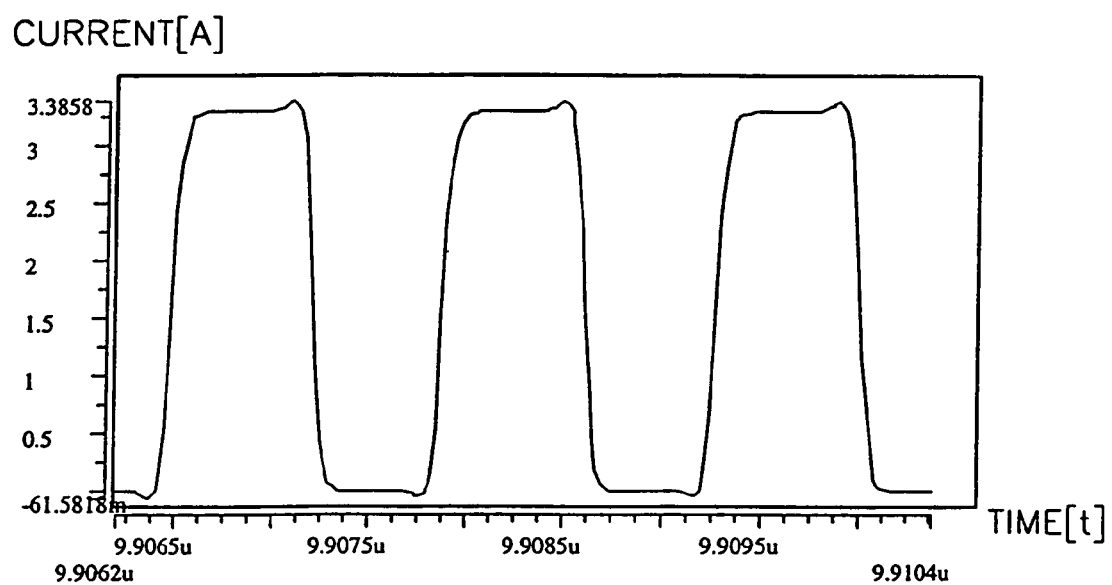

FIGS. 13A, 13B and 13C are other types of waveform views for illustrating the operation of the optical receiving unit 80 shown in FIG. 10. FIG. 13A shows the output signals of the duty compensator 940, FIG. 13B shows the output signal of the level converter 970, and FIG. 13C shows the output signal of the buffer unit 980.

The optical receiving unit 80 according to the present invention will now be described in more detail with reference to FIGS. 10 through 13. First, when a current signal of a type shown in FIG. 11A is applied from the photo diode unit 900, parasitic elements, which can be caused by a lead frame or a pad, in the parasitic element unit 910 appear in a noise-containing waveform as shown in FIG. 12A. That is, a current signal, which has been primarily affected by the parasitic capacitor C46 in the photo diode unit 900, is again affected by the parasitic element unit 910, so that a received waveform is in a bad condition.

At this time, the current signal shown in FIG. 12A is applied to the current-to-voltage converter 920 and output as a differential input signal of a type shown in FIG. 12B. In FIG. 12A, reference character VN1 denotes a voltage that is applied to the emitter of the transistor QN50, that is, to the first node N1, and reference character VN2 denotes a reference signal for making a differential input signal with respect to the input signal VN1. That is, the input signal VN1 and the reference signal VN2 shown in FIG. 12B are output as differential signals from the current-to-voltage converter 920. These differential signals are differentially amplified by the amplifier 930 and output to the third and fourth nodes N3 and N4, respectively. The third and fourth nodes N3 and N4 denote the emitter voltages of the NPN transistors QN63 and QN62, respectively.

Figure 12C:
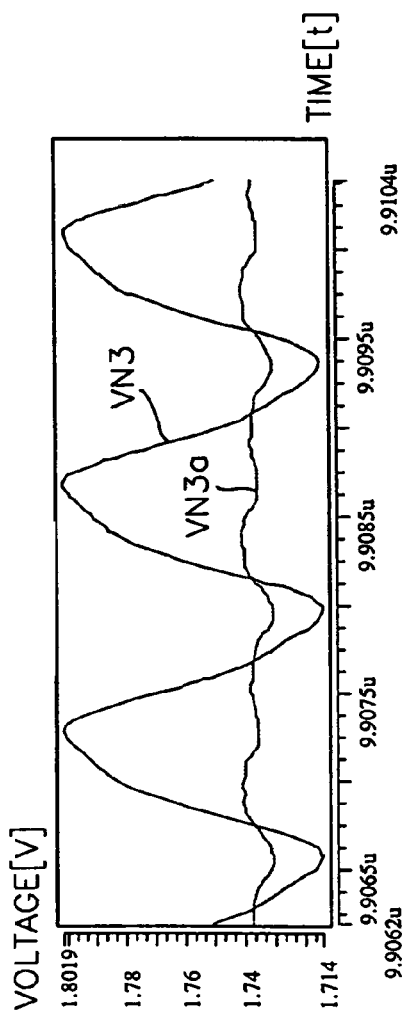
Figure 12D:
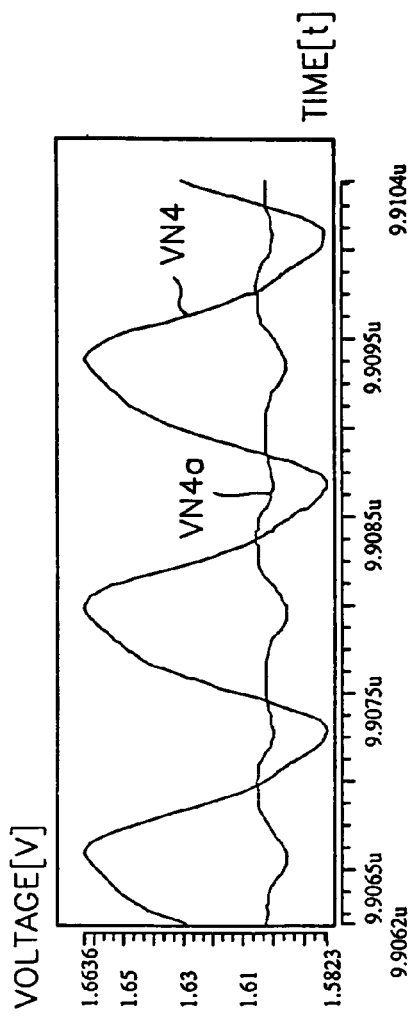

The voltages VN3 and VN4 of the third and fourth nodes N3 and N4, respectively, are applied as input signals to two comparators in the duty compensator 940. The voltage waveform VN3 of FIG. 12C denotes a first amplification output which is applied to the base input of the NPN transistor QN66 of the duty compensator 940. The voltage waveform VN4 of FIG. 12D denotes a second amplification output which is applied to the base of the NPN transistor QN67 of the duty compensator 940. Referring to FIG. 12C, a voltage waveform VN3a is obtained by differentiating the voltage VN3 of the third node N3 using the resistor R75 and the capacitor C75, and becomes a reference voltage for the first comparator. Referring to FIG. 12D, a voltage waveform VN4a is obtained by differentiating the voltage VN4 of the fourth node N4 using the resistor R76 and the capacitor C76, and becomes a reference voltage for the second comparator. As described above, in the present invention, a value obtained by differentiating an input signal is set to be a reference voltage, so that a reference level is proportional to various input signals. The input signal and the reference voltage shown in each of FIGS. 12C and 12D are compared by a different comparator, and the results of the comparison are output from the fifth and sixth nodes N5 and N6, respectively. The voltage waveforms VN5 and VN6 of FIG. 13A denote the emitter voltages of the NPN transistors QN71 and QN70, respectively, of the duty compensator 940. Referring to FIGS. 12C, 12D and 13A, it can be seen that the voltage VN3 of the third node N3 is proportional to the voltage VN5 of the fifth node N5. Referring to FIG. 13A, two voltage signals VN5 and VN6 cross each other at their middle points. That is, the duty of the output signal of the optical receiving unit 80 is determined by the position at which two signals differentially output from the duty compensator 940 are crossed. Thus, it is important to design differential signals such that they accurately cross each other at their middle points. That is, in the present invention, relative comparison is performed by the differential signals in the duty compensator 940, so that the duty of the output signal can be accurately estimated. The output signals N5 and N6 of the duty compensator 940, which cross each other as shown in FIG. 13A, are applied to the bases of the input transistors QN80 and QN81, respectively, of the level converter 970. FIG. 13B shows the results of simulation of the output signal of the level converter 970, wherein the voltage VN7 of the seventh node N7 is shown. Thus, when the voltage VN5 of the fifth node N5 is kept high on the basis of the crossing point shown in FIG. 13A, the potential of the seventh node N7 shown in FIG. 13B decreases. On the other hand, when the voltage VN6 of the sixth node N6 is kept high on the basis of the crossing point shown in FIG. 13A, the potential of the seventh node N7 shown in FIG. 13B increases. As described above, a signal whose level has been converted into a TTL level is buffered by the buffer unit 980, and the driving capability of the signal is improved, resulting in the waveform of FIG. 13C.

Consequently, as shown in FIGS. 12 and 13, an analog current signal applied to the optical receiving unit 80 is converted into a final signal having a TTL level and converted into a digital output.

Figure 14:
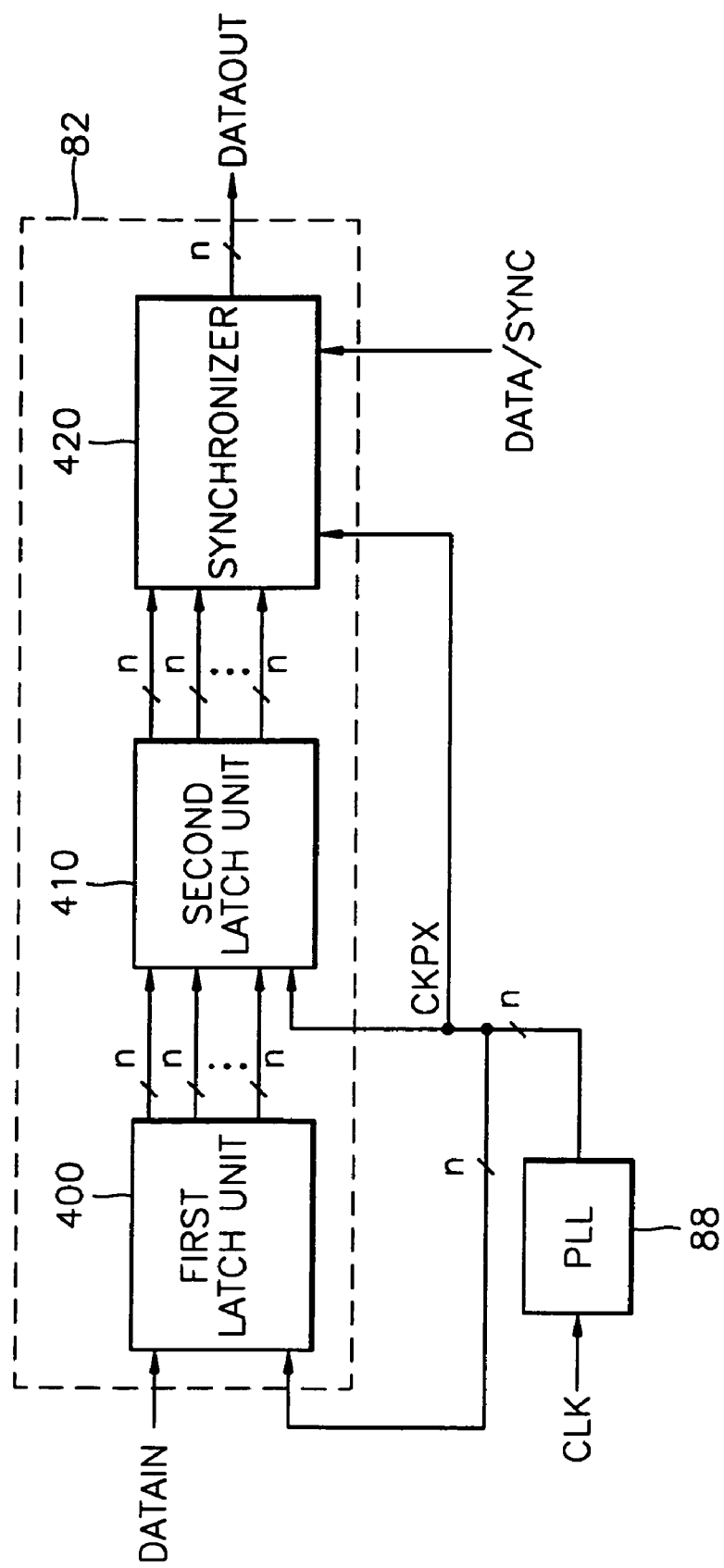
FIG. 14 is a block diagram of the data restoration and skew compensation unit shown in FIG. 8.

FIG. 14 is a block diagram of the data restoration and skew compensation unit 82 shown in FIG. 8 which includes first and second latch units 400 and 410 and a synchronizer 420. For convenience of explanation, a phase locked loop (PLL) 88 is also shown in FIG. 14.

The PLL 88 receives a clock signal CLK via the optical receiving unit 80 and produces first through n-th non-overlapping clock signals each having a predetermined offset to prevent overlapping between them. Here, n can be assumed to be 9.

The first latch unit 400 latches the received serial data in parallel in response to n non-overlapping clock signals to produce n-bit parallel data. If n is 9, 9-bit parallel data can be assumed to be a word. Also, the latched parallel data are output as state data having the time difference of a predetermined offset between them. Here, the state data can be four-channel data for a control signal CON including R, G and B color signals and a synchronous signal. Also, for convenience of explanation, the R, G and B color signals are referred to as information data. According to a system realization method, N types of state data can be realized rather than four types of state data.

The second latch unit 410 latches state data output from the first latch unit 400 in parallel in response to a non-overlapping clock signal having the greatest timing margin among n non-overlapping clock signals. Here, the non-overlapping clock signal having the greatest timing margin is defined as an X-th ($0 \leq X \leq n$) clock signal, that is, as CKPX.

The synthesizer 420 receives data latched by the second latch unit 410, and outputs state data from which a synchronous signal is detected, as restored information data in response to a predetermined synchronous existence signal and an X-th non-overlapping clock signal. Here, the synchronous existence signal DATA/SYNC, which is a signal representing whether a synchronous signal exists in received data, is applied from an external source.

That is, the data restoration and skew compensator 82 shown in FIG. 14 restores data compressed by the transmitter 12 of FIG. 1 into the original parallel data, and compensates for skew when channel data received via the optical transmission line 15 is skewed.

Figure 15:
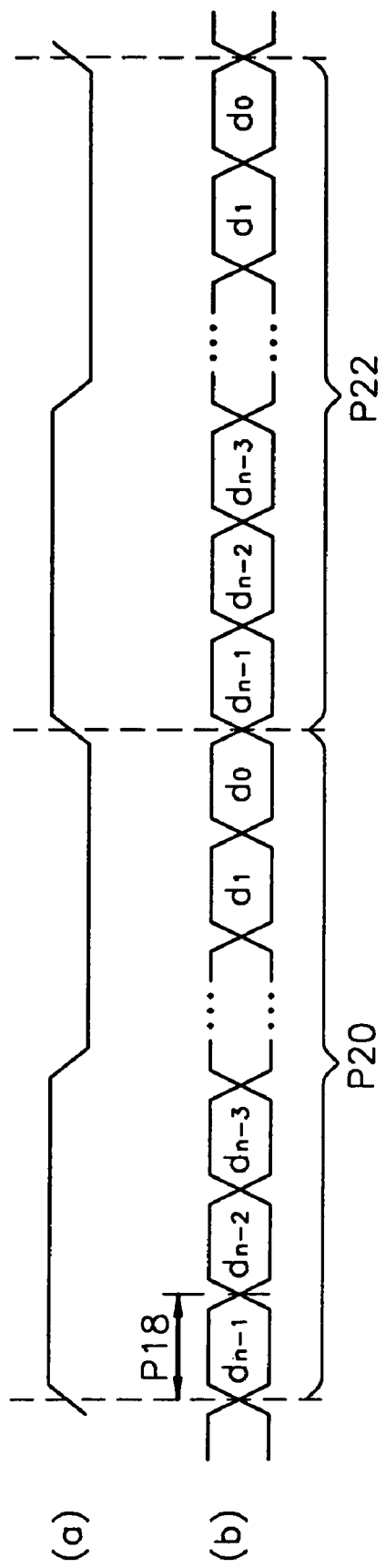
FIG. 15 shows the waveforms of a word clock signal and serial data which are applied to the data restoration and skew compensation unit shown in FIG. 14.

FIG. 15 shows the waveforms for illustrating the operation of the apparatus shown in FIG. 14. In FIG. 15, (a) illustrates a clock signal CLK which is received via the optical receiver 80, and (b) illustrates serial channel data (DATAIN) which is received via the optical receiving unit 80.

Figure 16:
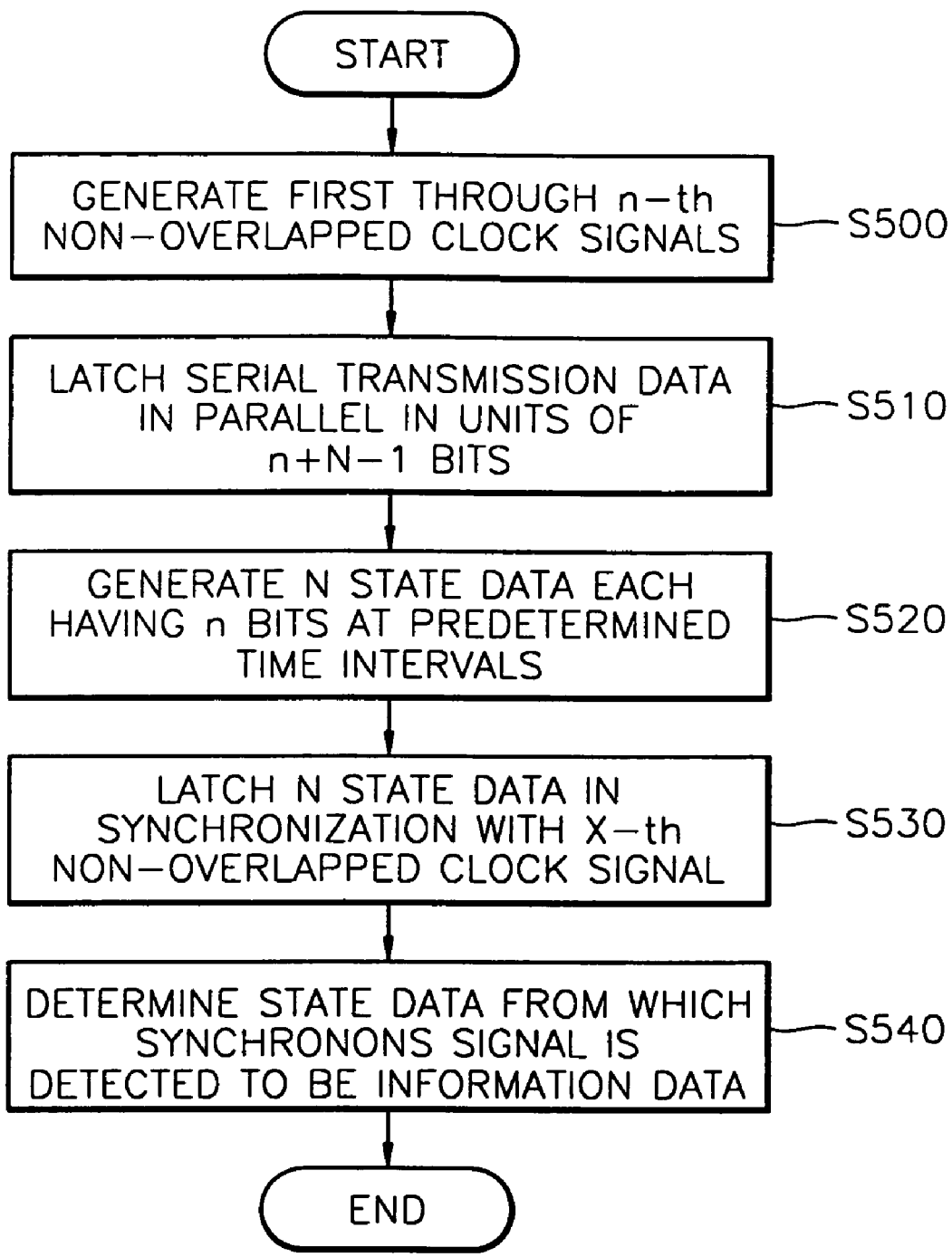
FIG. 16 is a flowchart illustrating a data restoration method using the apparatus shown in FIG. 14.

FIG. 16 is a flowchart illustrating a data restoration method using the apparatus shown in FIG. 14. The data restoration method according to the present invention includes steps S500, S510 and S520 of obtaining N types of state data using the serial data DATAIN and the clock signal CLK, and steps S530 and S540 of determining from which state data a synchronous signal is detected.

The data restoration and skew compensation unit 82 according to the present invention, and the data restoration method performed by the same will now be described with reference to FIGS. 14 through 16.

First, the PLL 88 shown in FIG. 14 receives the clock signal CLK shown in FIG. 15(a) via the optical receiving unit 80. Also, the PLL 88 generates n non-overlapped clock signals CKP, each of which has a predetermined offset to prevent mutual overlapping, on the basis of the clock signal CLK, in step S500. Here, n is a positive integer. The predetermined offset can correspond to the width (P18) of a unit bit in the serial data shown in FIG. 15(b). For example, as described later, a first non-overlapped clock signal has the same phase and period as those of the clock signal CLK shown in FIG. 15(a). Also, a second non-overlapped clock signal is defined as a signal whose phase has been shifted by the width (P18) of the unit bit. As described above, the PLL 88 can generate n non-overlapped clock signals, the phases of which are offset by, for example, P18, by shifting the phase of the first non-overlapped clock signal at intervals of the predetermined offset P18.

After the step S510, the first latch unit 400 latches the serial data DATAIN shown in FIG. 15(b) in parallel in units of n+N−1 bits in response to the n non-overlapped clock signals, in step S520. Here, N denotes a positive integer greater than or equal to 3. The serial data DATAIN denotes data obtained by multiplexing a n-bit synchronous signal and n-bit information data on R, G and B color signals. Thus, the serial data DATAIN together with the clock signal CLK is serially transmitted via the optical receiver 80. Here, the synchronous signal represents a horizontal synchronous signal and a vertical synchronous signal. For example, as shown in FIG. 15(b), the serial data DATAIN has a structure in which n-bit information data $(d_0, d_1, \ldots, d_{n-3}, d_{n-2}, d_{n-1})$ P20 and an n-bit synchronous signal $(d_0, d_1, \ldots, d_{n-3}, d_{n-2}, d_{n-1})$ P22 are multiplexed. Thus, the synchronous signal P22 is inserted per information data.

Thereafter, the first latch unit 400 outputs N types of n-bit state, each of which has the time difference of a predetermined offset and has been latched in step S510, to the second latch unit 410. Here, N types of state data include first state data DD which synchronizes with the clock signal CLK shown in FIG. 15(a), at least one second state data DL whose phase lags that of the first state data, and at least one third state data DE whose phase leads that of the first state data.

After the step S520, the second latch unit 410 latches N state data output from the first latch unit 400 in parallel in synchronization with the X-th non-overlapped clock signal having the greatest timing margin among the n non-overlapped clock signals CKP0 through $CKP_{n-1}$, in step S530. The step S530 is performed to simultaneously provide n types of state data output from the first latch unit 400 in parallel to the synchronizer 420. That is, the first latch unit 400 shown in FIG. 14 operates in response to the n non-overlapped clock signals, but the second latch unit 410 and the synchronizer 420 operate in response to only the X-th non-overlapped clock signal.

After the step S530, the synchronizer 420 determines state data from which a synchronous signal is detected, among the state data latched by the second latch unit 410, to be restored information data DATAOUT, in response to the synchronous existence signal DATA/SYNC and the X-th non-overlapped clock signal CKPX, in step S540. Here, the synchronous existence signal DATA/SYNC is defined as a signal representing whether received data is information data such as a real R/G/B color signal or a horizontal or vertical synchronous signal.

For a better understanding of the present invention, assuming that n is equal to 9, that is, one word is equal to 9 bits, and N is equal to 3, the apparatus shown in FIG. 14 and the method shown in FIG. 16 will now be described.

Figure 17:
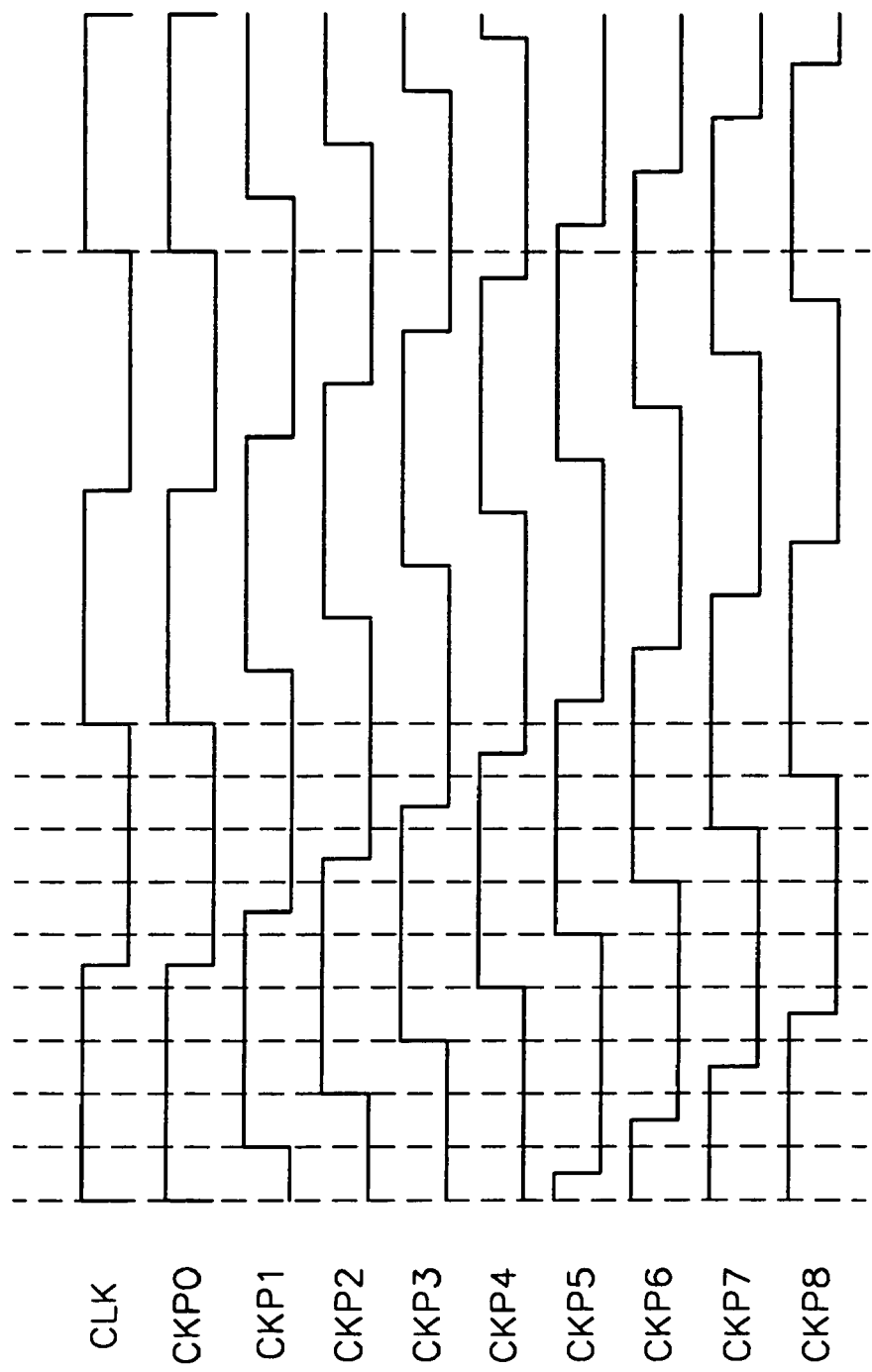
FIG. 17 shows the waveforms of a word clock signal and first through ninth non-overlapped clock signals which are generated by a clock signal generator.

FIG. 17 shows the waveforms of the clock signal CLK and first through ninth non-overlapped clock signals CKP0 through CKP8 which are output from the PLL 88 shown in FIG. 14.

Figure 18:
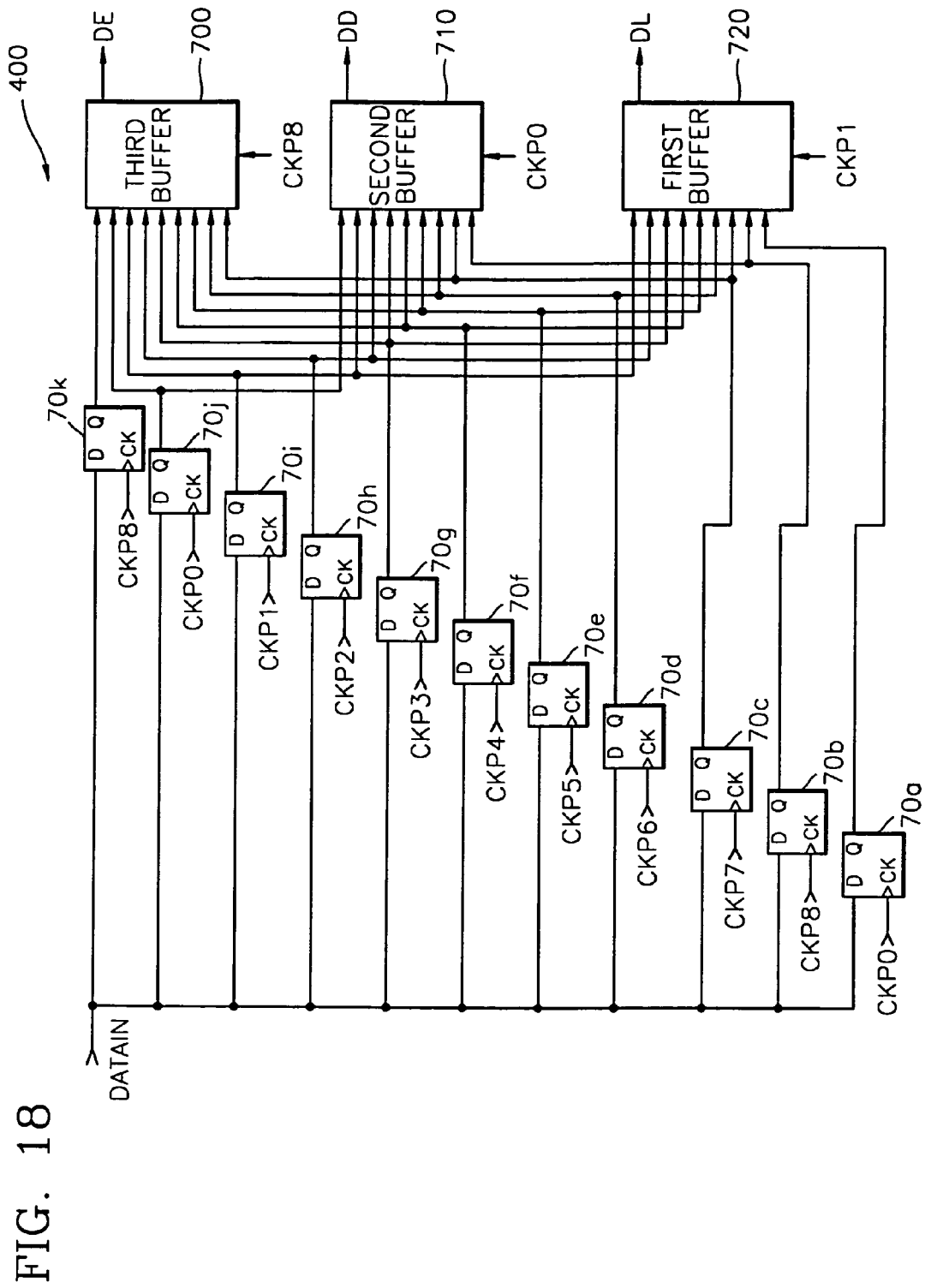
FIG. 18 is a circuit diagram illustrating the first latch unit shown in FIG. 14 in detail.

FIG. 18 is a circuit diagram of the first latch unit 400 shown in FIG. 14. The first latch unit 400 includes first through eleventh flip flops 70a through 70k and first through third buffers 700, 710 and 720.

Each of the first through eleventh flip flops 70a through 70k shown in FIG. 18 receives a unit bit of received serial transmission data DATAIN via its data input port D, and first through ninth non-overlapped clock signals CKP0 through CKP8 via its clock port CK. For example, the first flip-flop 70a receives the first non-overlapped clock signal CKP0 via its clock port CK, and one bit of serially-received serial data DATAIN via its data input port D.

The first buffer 720 receives and buffers the positive outputs Q of the first through ninth flip flops 70a through 70i. The results of buffering are output as second state data DL in response to the second non-overlapped clock signal CKP1. The second buffer 710 receives and buffers the positive outputs Q of the second through tenth flip flops 70b through 70j. The results of buffering are output as first state data DD in response to the first non-overlapped clock signal CKP0. The third buffer 700 receives and buffers the positive outputs Q of the third through eleventh flip flops 70c through 70k. The results of buffering are output as third state data DE in response to the ninth non-overlapped clock signal CKP8.

As shown in FIG. 17, the first non-overlapped clock signal CKP0 has the same phase and period of those of the clock signal CLK, the phase of the second non-overlapped clock signal CKP1 lags that of the clock signal CLK by the width of a unit bit, and the phase of the ninth non-overlapped clock signal CKP8 leads that of the clock signal CLK by the width of a unit bit. Thus, the phase of the first state data DD leads that of the second state data DL by the width of a unit bit and lags that of the third state data DE by a unit bit. As described above, the reason why the second and third state data DL and DE, which have a phase difference the size of the unit bit width of the clock signal CLK, are generated, is to compensate for a skew as will be described below.

Figure 19:
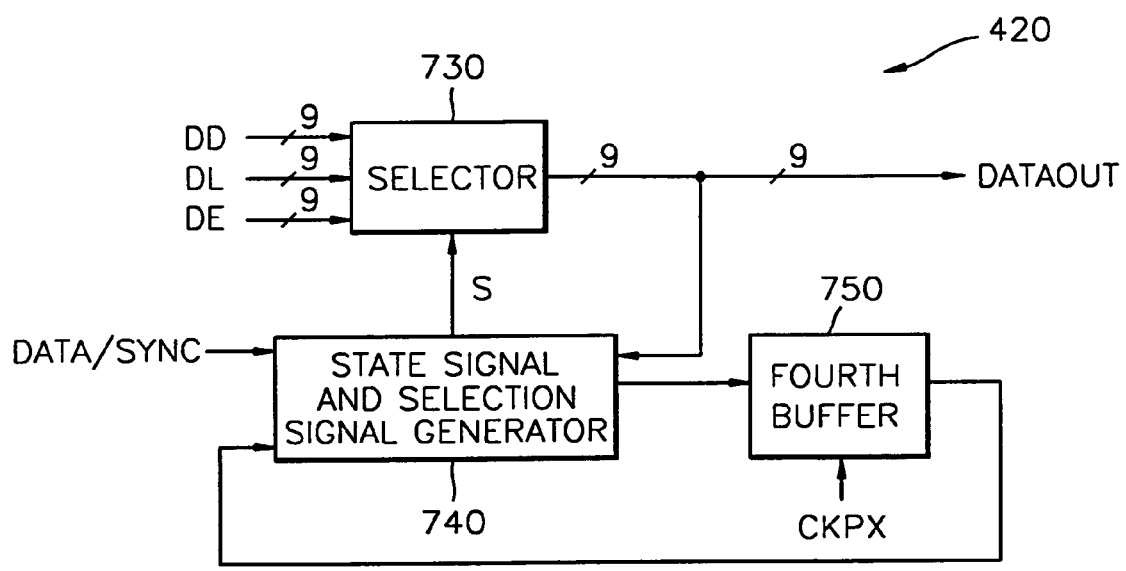
FIG. 19 is a circuit diagram illustrating the synchronizer shown in FIG. 14 in detail.

FIG. 19 is a block diagram of the synchronizer 420 shown in FIG. 14. The synchronizer 420 includes a selector 730, a state signal and selection signal generator 740, and a fourth buffer 750.

The selector 730 of FIG. 19 selects one among the first, second and third state data DD, DL and DE output from the second latch unit 410 in response to a selection signal S, and outputs a selected result DATAOUT to the state signal and selection signal generator 740. The state signal and selection signal generator 740 compares the first, second or third state data DD, DL or DE with a predetermined bit pattern of a pre-stored synchronous signal in response to the synchronous existence signal DATA/SYNC. Also, the state signal and selection signal generator 740 logically combines the result of comparison and a current state signal representing the current state to generate a selection signal S and a next state signal representing the next state. The selection signal S is applied to the selector 730 and the next state signal is applied to the fourth buffer 750. Here, the selector 730 selects the first state data DD in its initial state according to the selection signal S, or the second state data DL if the first state data is not consistent with the predetermined bit pattern of the synchronous signal. Also, the selector 730 selects the third state data DE according to the selection signal S if the second state data DL is not consistent with the predetermined bit pattern of the synchronous signal. To do this, the state signal and selection signal generator 740 logically combines the current state signal output from the fourth buffer 750, thereby generating the next state signal.

The fourth buffer 750 buffers the next state signal output from the state signal and selection signal generator 740, in response to an X-th non-overlapped clock signal CKPX, for example, an eighth non-overlapped clock signal CKP7. The resultant signal buffered by the fourth buffer 750 is applied as the current state signal to the state signal and selection signal generator 740. Here, as described below, restored information data DATAOUT corresponds to state data selected by the selector 730 when the information data DATAOUT is consistent with the predetermined bit pattern of the synchronous signal.

Figure 20:
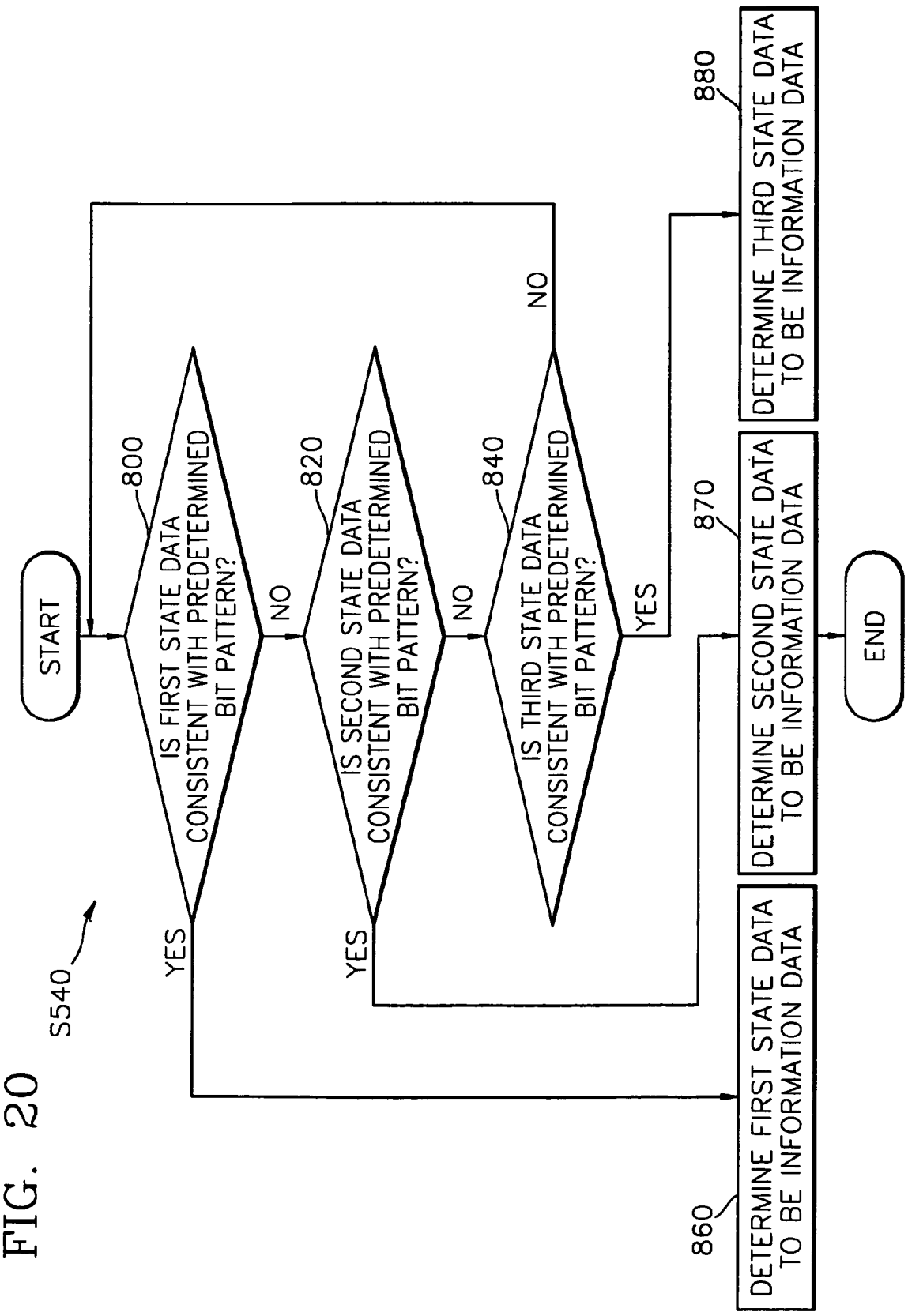
FIG. 20 is a flowchart illustrating the step S540 shown in FIG. 16 in detail.

FIG. 20 is a flowchart illustrating the step S540 shown in FIG. 16 in detail. The step S540 includes substeps 800 through 880 of comparing the first, second and third state data DD, DL and DE with the predetermined bit pattern of the synchronous signal to determine the original information data DATAOUT.

First, if serial transmission data DATAIN received via a transmission channel is a synchronous signal, the state signal and selection signal generator 740 shown in FIG. 19 determines whether the first state data DD is consistent with the predetermined bit pattern of the synchronous signal, in step 800. If the serial transmission data DATAIN is a synchronous signal, a high level synchronous existence signal DATA/SYNC is received from an external source. If the serial transmission data DATAIN is information data, a low level synchronous existence signal DATA/SYNC is received from an external source. Here, the state signal and selection signal generator 740 is enabled only when the high level synchronous existence signal DATA/SYNC is received. Also, the state signal and selection signal generator 740 bypasses the current state signal as the next state signal if the low level synchronous existence signal DATA/SYNC is received.

If the first state data DD is consistent with the predetermined bit pattern of the synchronous signal, it is determined to be the restored information data DATAOUT, in step 860.

However, if the first state data DD is not consistent with the predetermined bit pattern, the state signal and selection signal generator 740 determines whether the second state data DL is consistent with the predetermined bit pattern, in step 820. If the second state data DL is consistent with the predetermined bit pattern, it is determined to be the restored information data DATAOUT, in step 870.

On the other hand, if the second state data DL is not consistent with the predetermined bit pattern, it is determined whether the third state data DE is consistent to the predetermined bit pattern in step 840. If the third state data DE is consistent with the predetermined bit pattern, it is determined to be the restored information data DATAOUT, in step 880. However, if the third state data DE is not consistent with the predetermined bit pattern, the step 800 is again performed. The step 800 is also performed when the first, second or third state data DD, DL or DE is not consistent with the predetermined bit pattern even after it is determined to be the restored information data.

Consequently, if no skew exists between the serial transmission data DATAIN and the clock signal CLK, the first state data DD is determined to be the restored information data. Also, if a skew having a cycle of ±1 bit exists between the serial transmission data DATAIN and the clock signal CLK, the second or third state data DD or DE is determined to be the restored information data.

In the aforementioned embodiment, it is assumed that n is equal to 9 and N is equal to 9. However, if the values of n and N are changed, the apparatus according to the present invention shown in FIG. 1 may compensate for skew having a cycle of ±2 or more bits between the serial transmission data DATAIN and the clock signal CLK.

According to the present invention, data transmission between a PC and a display device such as an LCD monitor is replaced with optical transmission, so that fast data transmission can be achieved, and also so that the effects of electromagnetic interference (EMI) noise or interference which can be generated by an electrical cable are mitigated or eliminated. Long distance transmission can be realized without increasing the cost of transmission, and the optical transfer system can be simply applied to a high-definition (HD) display device.

Furthermore, according to the present invention, when serial transmission data in which a synchronous signal and information data are multiplexed is transmitted/received, the information data can be stably restored from the serial transmission data even if the transmission channel introduces skew.

While this invention has been particularly shown and described with reference to preferred embodiments thereof, it will be understood by those skilled in the art that various changes in form and detail may be made herein without departing from the spirit and scope of the invention as defined by the appended claims.

What is claimed is:

1. An optical transfer system for converting an externally-applied video signal into an optical signal and for restoring the optical signal to the original video signal, the system comprising:
   a video controller for separating color signals and a horizontal/vertical synchronous signal from an original video signal, and for transmitting the color signals and the horizontal/vertical synchronous signal in response to an externally-applied predetermined data enable signal and clock signal;
   a transmitter that includes a transmitter phase locked loop that, in response to the clock signal, generates a first plurality of non-overlapping clock signals of different respective phases, the transmitter for skew-compensating signals received from the video controller, for compressing the skew-compensated signals in response to the first plurality of non-overlapping clock signals, and for converting the compressed signals to a driving current, wherein the transmitter phase locked loop further generates a synchronized clock signal to serve as a clock signal for data transmission in response to the externally-applied clock signal and wherein the transmitter further comprises:
   a skew compensator for receiving data, each data having a predetermined number of bits, from the video controller, in response to the synchronized clock signal, via different channels, and compensating for a skew which is generated between the channel data in response to the synchronized clock signal;

a scrambler for counting the number of high levels and the number of low levels of each of the skew-compensated channel data, and adding the counted information to each of the channel data to serve as direct current balance information, and transmitting the resultant data;

a data serialization unit for compressing the scrambled channel data in response to the synchronized clock signal to obtain 1-bit channel data; and an optical driver for receiving the compressed channel data and the clock signal as different channel data and converting the received data into current signals, in order to drive the transmission photo diode, wherein the optical driver comprises:

a bias and modulation resistance variation unit including a bias resistor and a modulation resistor, the resistance value of each of which is variable, for varying a current amount, which is output due to variations in the resistance values of the bias resistor and the modulation resistor;

a bandgap circuit for determining a bandgap reference voltage, which is maintained to a constant value independently of external changes, and for varying a bias current or a modulation current according to the determined reference voltage and current variations due to variations in the resistance of the bias resistor and the modulation resistor; and a laser driver for converting received channel data into current signals and for adding the modulation current and bias current of the current signals to obtain a driving current for driving external optical devices;

a transmission photo diode for converting the driving current to an optical signal and for outputting the optical signal;

an optical transmission line comprised of a predetermined number of channels, for transmitting the optical signal;

a reception photo diode for converting the optical signal received from the optical transmission line into a current signal and for outputting the current signal, and a receiver that includes a receiver phase locked loop that generates a second plurality of non-overlapping clock signals of different respective phases in response to a received clock included in the received optical signal, at least one of the non-overlapping clock signals having a phase that is the same as a phase of the received clock, the non-overlapping clock signals each having a frequency that is the same as a frequency of the received clock, for converting the current signal into a voltage signal, for decompressing the voltage signal in response to the second plurality of non-overlapping clock signals of different respective phases, for compensating for the skew of the voltage signal, and for restoring the original signal.

2. The optical transfer system of claim 1, wherein the bandgap circuit comprises:

a bandgap reference voltage generator for compensating according to a variation in the voltage of a first node, which is a basis for voltage determination, so that the voltage of the first node maintained at a constant value, and for operationally amplifying the bandgap reference voltage and a voltage at the modulation resistor while operationally amplifying the bandgap reference voltage and a voltage at the bias resistor, thereby to obtain first and second output voltages, respectively;

a bias and modulation current generator for constantly maintaining the first and second output voltages and the voltages at the modulation resistor and the bias resistor by feeding the first and second output voltages back to the bandgap reference voltage generator, and for varying the modulation or bias current in response to the voltages at the modulation resistor or the bias resistor; and a power save controller having at least one switch, which is switched in response to an externally-input power save control signal, for converting the modes of the bandgap reference voltage generator and the bias and modulation current generator into sleep modes in response to the switching of the switches.

3. The optical transfer system of claim 1, wherein the laser driver comprises:

a data separation unit for splitting the channel data into a non-inverted signal and an inverted signal to obtain a non-inverted output signal and an inverted output signal; and a voltage-to-current conversion and current driving unit for calculating the voltage difference between the non-inverted output signal and the inverted output signal to obtain a current corresponding to the voltage difference, and for adding the current to the bias current and the modulation current to obtain the driving current.

4. The optical transfer system of claim 1, wherein the receiver phase locked loop further generates a clock signal in response to the received clock included in the received optical signal, and wherein the receiver further comprises:

an optical receiver for converting current signals received from the reception photo diode into voltage signals, and for duty-compensating and level-converting the voltage signals to obtain digitalized signals which are different channel data; and a data restoration and skew compensation unit for receiving channel data that has been compressed by the transmitter, for decompressing the compressed data in response to the second plurality of non-overlapping clock signals, and for skew-compensating the decompressed data to obtain different channel data each having a predetermined number of bits; and a descrambler for descrambling in response to the direct current balance information in each of the channel data, so that the low level and high level of the channel data balance with each other.

5. The optical transfer system of claim 4, wherein the optical receiver comprises:

a bias circuit for receiving a predetermined amount of current from a power supply voltage and generating first and second bias currents;

a current-to-voltage converter for sourcing a current in response to the first bias current and converting a current signal received from the reception photo diode into a differential voltage signal;

an amplifier for sourcing a current in response to the first bias current and amplifying the differential voltage signal to obtain first and second differential output signals;

a duty compensator realized with different comparators having a current summing structure in which output currents are summed, the duty compensator for sourcing a current in response to the first bias current and comparing the first differential output signal with a first reference voltage and the second differential output signal with a second reference voltage to obtain first and second output signals which correspond to the compared results;

a level converter for sourcing a current in response to the second bias current and digitalizing the first and second output signals by converting the voltage levels of the first and second output signals; and a buffer unit for buffing and amplifying signals received from the level converter to obtain the digital channel data.

6. The optical transfer system of claim 4, wherein the optical receiver further comprises a power down controller for powering down the bias circuit so that it does not operate, in response to an externally-applied power down control signal.

7. The optical transfer system of claim 4, wherein the data restoration and skew compensation unit comprises:

a first latch unit for latching data received in series from the optical receiver, in units of n+N−1 (where N is a positive integer greater than or equal to 3) bits in parallel in response to the second plurality of non-overlapping clock signals comprising first through n-th non-overlapped clock signals, and outputting N n-bit latched state data having the time difference of a predetermined offset therebetween;

a second latch unit for latching in parallel the N state data in response to an X-th (1≦X≦n) non-overlapped clock signal having the greatest timing margin among the first through n-th non-overlapped clock signals; and a synchronizer for outputting state data from which the synchronous signal is detected, among data latched by the second latch unit, as restored information data, in response to a predetermined synchronous existence signal and the X-th non-overlapped clock signal, wherein the first through n-th non-overlapped clock signals each has a predetermined offset so that the clock signals are not overlapped with each other.

8. A data restoration and skew compensation unit in a receiver having a phase locked loop for generating first through n-th non-overlapped clock signals in response to a clock signal received on a transmission channel, each having a predetermined offset and a different respective phase to prevent mutual overlapping, the receiver for restoring data in which n-bit synchronous signals (where n is a positive integer greater than or equal to 1) and n-bit information data are multiplexed and transmitted in series via the transmission channel, in response to the first through n-th non-overlapped clock signals, the data restoration and skew compensation unit comprising:

a first latch unit for latching received serial data in units of n+N 1 (where N is a positive integer greater than or equal to 3) bits in parallel in response to the first through n-th non-overlapped clock signals of different respective phases generated in response to the received clock signal, at least one of the first though n-th non-overlapped clock signals having a phase that is the same as a phase of the received clock signal, the first through n-th non-overlapped clock signals each having a frequency that is the same as a frequency of the received clock signal, and for outputting N n-bit latched state data having the time difference of a predetermined offset therebetween, wherein the first latch unit comprises:

first through (n+N−1)th flip flops for data-receiving bit units constituting the received serial data, and for clock-receiving the first through n-th non-overlapped clock signals; and first through N-th buffers for buffering the data output of n flip flops among the first through (n+N−1)th flip flops and outputting the buffered results as the state data;

a second latch unit for latching in parallel the N state data in response to an X-th (1×n) non-overlapped clock signal having the greatest timing margin among the first through n-th non-overlapped clock signals; and a synchronizer for outputting state data from which the synchronous signal is detected, among data latched by the second latch unit, as restored information data in response to a predetermined synchronous existence signal and the X-th non-overlapped clock signal.

9. The data restoration and skew compensation unit of claim 8, wherein the predetermined offset is the width of a unit bit constituting the serial data.

10. The data restoration and skew compensation unit of claim 8, wherein the synchronizer comprises:

a selector for selectively outputting the N state data in response to a selection signal;

a state and selection signal generator for comparing state data selected by the selector with the bit pattern of the synchronous signal in response to the sync existence signal and a current state signal representing the current state, and for outputting the selection signal and a next state signal representing the next state, in response to the results of the comparison; and an (N+1)th buffer for buffering the next state signal in response to the X-th non-overlapped clock signal and outputting the result of buffering as the current state signal, wherein the restored information data is state data selected by the selector when the state data is consistent with the bit pattern of the synchronous signal.

11. A method of restoring information data from data in which n-bit synchronous signals (where n is a positive integer greater than or equal to 1) and the n-bit information data are multiplexed and transmitted together with a clock signal in series via a transmission channel, the method comprising:

(a) generating first through n-th non-overlapped clock signals, each having a predetermined offset and a different respective phase to prevent mutual overlapping, on the basis of the clock signal, at least one of the first through n-th non-overlapped clock signals having a phase that is the same as a phase of the clock signal, the first through n-th non-overlapped clock signals each having a frequency that is the same as a frequency of the clock signal;

(b) latching received serial data in units of n+N 1 (where N is a positive integer greater than or equal to 3) bits in parallel in response to the first through n-th non-overlapped clock signals of different respective phases;

(c) generating N n-bit latched state data having the time difference of a predetermined offset therebetween;

(d) latching in parallel the N state data in synchronization with a X-th (1×n) non-overlapped clock signal having the greatest timing margin among the first through n-th non-overlapped clock signals; and (e) determining state data from which the synchronous signal is detected, among the latched state data, to be the restored information data, when the serial data is the synchronous signal, wherein the step (e) comprises:

(e1) determining whether the first state data, which synchronizes with the clock signal, among the state data, is consistent with the bit pattern of the synchronous signal, when the serial data is the synchronous signal;

(e2) determining the first state data to be the restored information data, when the first state data is equal to the bit pattern;

(e3) determining whether the second state data, which is lagged by the predetermined offset with respect to the first state data, among the state data, is consistent with the bit pattern of the synchronous signal, if the first state data is not consistent with the bit pattern of the synchronous signal;

(e4) determining the second state data to be the restored information data, when the second state data is equal to the bit pattern;

(e5) determining whether the third state data, which leads by the predetermined offset with respect to the first state data, among the state data, is consistent with the bit pattern of the synchronous signal, if the second state data is not consistent with the bit pattern of the synchronous signal;

(e6) determining the third state data to be the restored information data, when the third state data is equal to the bit pattern; and (e7) feeding back to the step (e1) if the third state data is not consistent with the bit pattern of the synchronous signal, wherein after the first, second or third state data is determined to be the restored information data, if it is not consistent with the bit pattern, the step (e1) is performed.

* * * * *